US012143820B2

United States Patent
Da Silva et al.

(10) Patent No.: US 12,143,820 B2
(45) Date of Patent: Nov. 12, 2024

(54) INTEGRITY PROTECTION OF RADIO RESOURCE CONTROL MESSAGE

(71) Applicant: Telefonaktiebolaget LM Ericsson (publ), Stockholm (SE)

(72) Inventors: Icaro Leonardo Da Silva, Solna (SE); Prajwol Kumar Nakarmi, Sollentuna (SE); Gunnar Mildh, Sollentuna (SE); Magnus Stattin, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 217 days.

(21) Appl. No.: 17/775,631

(22) PCT Filed: Nov. 10, 2020

(86) PCT No.: PCT/SE2020/051083
§ 371 (c)(1),
(2) Date: May 10, 2022

(87) PCT Pub. No.: WO2021/096411
PCT Pub. Date: May 20, 2021

(65) Prior Publication Data
US 2022/0394476 A1    Dec. 8, 2022

Related U.S. Application Data

(60) Provisional application No. 62/933,750, filed on Nov. 11, 2019.

(51) Int. Cl.
*H04W 12/106* (2021.01)
*H04L 9/32* (2006.01)
(Continued)

(52) U.S. Cl.
CPC ......... *H04W 12/106* (2021.01); *H04L 9/3242* (2013.01); *H04W 12/037* (2021.01); *H04W 76/19* (2018.02)

(58) Field of Classification Search
CPC . H04W 12/106; H04W 12/037; H04W 76/19; H04W 12/122; H04W 76/27; H04L 9/3242; H04L 2209/80
See application file for complete search history.

(56) References Cited

U.S. PATENT DOCUMENTS

2018/0249479 A1\* 8/2018 Cho .................. H04W 12/086
2019/0149326 A1\* 5/2019 Li ............................. H04L 9/14
                                                                713/181
(Continued)

FOREIGN PATENT DOCUMENTS

EP          3373653 A1    9/2018
WO    2018202941 A1   11/2018
(Continued)

OTHER PUBLICATIONS

Huawei, et al., "Discussion on security algorithm negotiation issue for Resume, RNAU and Reestablishment", 3GPP TSG-RAN WG2 Meeting #104, R2-1817880, Spokane, USA,, Nov. 12-16, 2018, 1-14.

(Continued)

*Primary Examiner* — Joseph P Hirl
*Assistant Examiner* — Thomas A Gyorfi
(74) *Attorney, Agent, or Firm* — Murphy, Bilak & Homiller, PLLC

(57) ABSTRACT

A method performed by a wireless device (12) for use in a wireless communication system (10). The method comprises: receiving (W2100) signaling (22) indicating how the wireless device (12) is to generate a message authentication code, MAC, (20) for integrity protecting a Radio Resource Control, RRC, message (18) that 5 requests resumption of an RRC connection; generating (W2110) the MAC according to the signaling; and transmitting (W2120) the RRC message and the generated MAC. Further methods, a wireless (Continued)

devices, network nodes, computer programs, carriers and a communication system are also disclosed.

26 Claims, 17 Drawing Sheets

(51) Int. Cl.
*H04W 12/037* (2021.01)
*H04W 76/19* (2018.01)

(56) References Cited

U.S. PATENT DOCUMENTS

| | | | |
|---|---|---|---|
| 2019/0253895 A1* | 8/2019 | Xu | H04W 36/0016 |
| 2019/0313333 A1 | 10/2019 | Kim et al. | |
| 2019/0320316 A1 | 10/2019 | Mildh et al. | |
| 2019/0320318 A1 | 10/2019 | Lehtovirta et al. | |
| 2019/0320488 A1 | 10/2019 | Mildh et al. | |
| 2020/0092727 A1* | 3/2020 | Basu Mallick | H04W 8/22 |
| 2021/0076198 A1 | 3/2021 | Mildh et al. | |
| 2021/0160691 A1* | 5/2021 | Liu | H04W 12/037 |
| 2022/0007255 A1* | 1/2022 | Rugeland | H04W 36/0022 |

FOREIGN PATENT DOCUMENTS

| | | |
|---|---|---|
| WO | 2019030727 A1 | 2/2019 |
| WO | 2019097458 A1 | 5/2019 |
| WO | 2020058168 A1 | 3/2020 |

OTHER PUBLICATIONS

3GPP, "3GPP TS 33.401 V15.9.0", 3rd Generation Partnership Project; Technical Specification Group Services and System Aspects; 3GPP System Architecture Evolution (SAE); Security architecture (Release 15), Sep. 2019, 1-163.

3GPP, "3GPP TR 33.809 V0.7.0", 3rd Generation Partnership Project; Technical Specification Group Services and System Aspects Study on 5G Security Enhancement against False Base Stations (Release 16), Oct. 2019, 1-66.

3GPP, "3rd Generation Partnership Project; Technical Specification Group Services and System Aspects; Security architecture and procedures for 5G system (Release 15)", 3GPP TS 33.501 V15.1.0, Jun. 2018, 1-152.

CATT, "RRC connection re-establishment and resume procedures in NR", 3GPP TSG-RAN WG2 #99bis, R2-1710279 (Revision of R2-1707896), Prague, Czech Republic, Oct. 9-13, 2017, 1-6.

Ericsson, "Security for RRC Connection Suspend and Resume", 3GPP TSG-SA WG3 Meeting #83, S3-160588, revision of S3-16abcd, San Jose Del Cabo, Mexico, May 9-13, 2016, 1-3.

Ericsson, "Security for RRCConnectionResumeRequest message", 3GPP TSG-RAN WG2 #NR AH1801, Tdoc R2-1800431 (Revision of R2-1713306), Vancouver, Canada, Jan. 22-26, 2018, 1-8.

Ericsson, "Security for RRCResumeRequest message", 3GPP TSG-RAN WG2 #101, R2-1802373 (Revision of R2-1800431), Athens, Greece, Feb. 26-Mar. 2, 2018, 1-8.

Huawei, et al., "RRC Resume Request Authentication Token Calculation", 3GPP TSG SA WG3 (Security) Meeting #92 ad-hoc, S3-182851 (revision of S3-18xabc), Harbin (China), Sep. 24-28, 2018, 1-4.

* cited by examiner

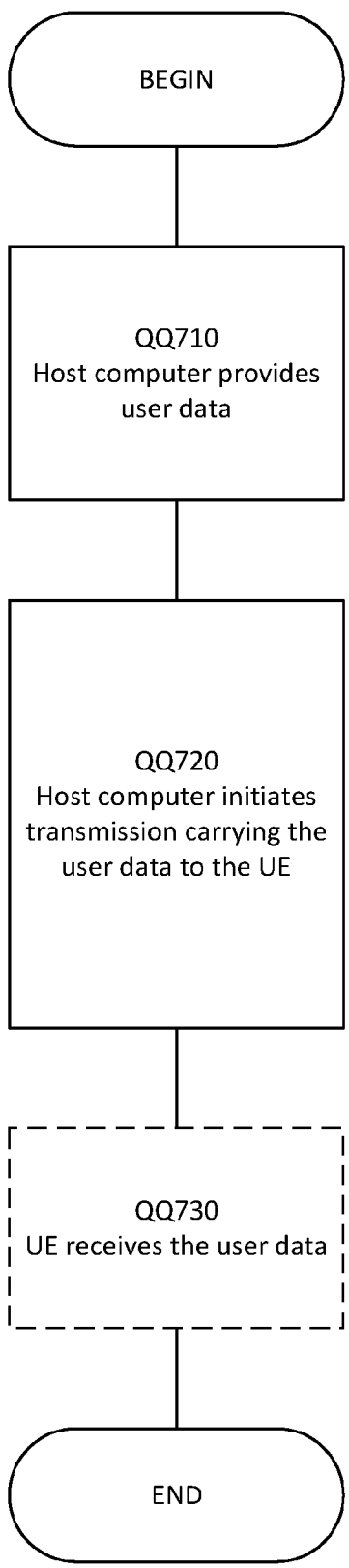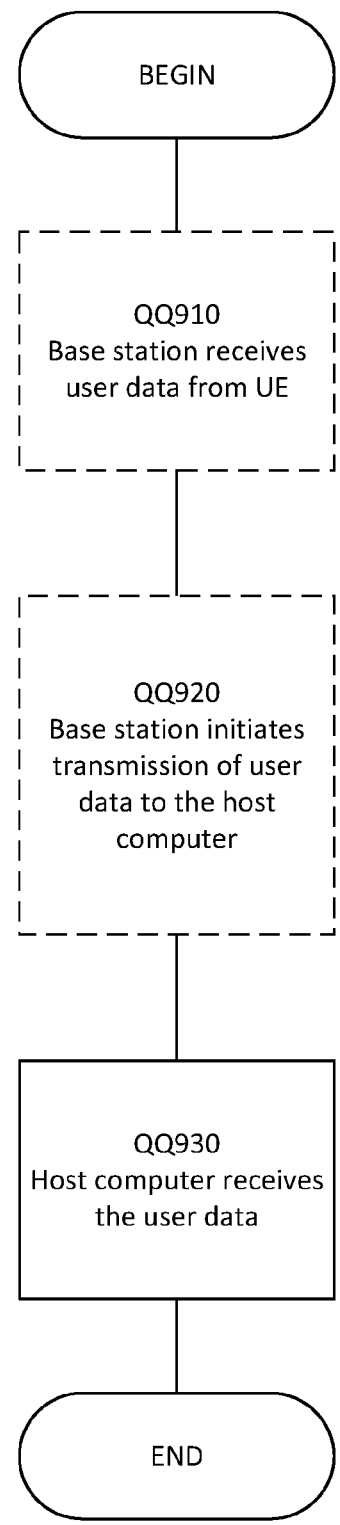
FIGURE 23
FIGURE 25

INTEGRITY PROTECTION OF RADIO RESOURCE CONTROL MESSAGE

TECHNICAL FIELD

The invention relates to methods, wireless devices and network nodes in relation to integrity protection of a Radio Resource Control message. Computer programs, carriers and a communication system are also disclosed.

BACKGROUND

In legacy wireless communication networks, such as those based on Long Term Evolution (LTE), a wireless device releases a connection (e.g., a radio resource control, RRC, connection) to an access network when the device has not actively used the connection for some time. The connection between the access network and the core network is also released. This frees the resources consumed by the connections for use by other devices. But the device discards the context for the connection with the access network when it outright releases the connection, meaning that the device will have to fully re-negotiate the context in order to later re-connect to the network.

In modern wireless communication networks, such as those based on New Radio (NR), a wireless device may just suspend its connection with the access network during relatively brief periods of inactivity. The device preserves the context for the connection when the connection is merely suspended, so that the connection can be more quickly resumed if needed using the preserved context. The connection between the access network and the core network remains intact. If inactivity continues for longer than a brief time, the device may only then release its connection with the access network.

In order to resume a suspended connection, a wireless device transmits a request to resume the connection to the network, e.g., to a target radio network node. To guard against a malicious party tampering with that request, the wireless device computes a security token for integrity protecting the request, e.g., in the form of a Message Authentication Code-Integrity (MAC-I). The security token is heretofore generated based on certain input parameters, such as a key, a bearer identity, and the like.

Improvements to the integrity protection provided by the security token could be realized by generating the security token based on additional input parameters. However, this proves challenging to do without creating problems with backwards compatibility. For example, if the wireless device generated the security token using these additional input parameters, the resume procedure would nonetheless fail if the resume request targeted a radio network node that did not support generation of the security token based on those additional parameters.

The 3GPP (Third Generation Partnership Project) document 3GPP TR 33.809 V0.7.0 mentions as a key issue #1 security concerns considering the RRC message RRCResumeRequest message for a 3GPP 5G system in case of a Man-in-the-middle (MiTM) attack by a false base station.

SUMMARY

An object of the invention is to enable strengthening of integrity protection in a wireless network.

A first aspect of the invention relates to a method performed by a wireless device for use in a wireless communication system. The method comprises: receiving signaling indicating how the wireless device is to generate a message authentication code, MAC, for integrity protecting a Radio Resource Control, RRC, message that requests resumption of an RRC connection; generating the MAC according to the signaling; and transmitting the RRC message and the generated MAC.

In an embodiment of the first aspect, a first way to generate the MAC is to input a first set of parameters into an integrity algorithm, and a second way to generate the MAC is to input a second set of parameters into the same algorithm or a different integrity algorithm. The first set of parameters is a subset of the second set of parameters, and the signaling indicates which of the first way or the second way the wireless device is to use to generate the MAC; or that the wireless device is to use the second way to generate the MAC.

The signaling may according to an embodiment of the first aspect indicate whether, or that, the wireless device is to generate the MAC as a function of one or more of: a cause field indicating a cause for requesting resumption of the RRC connection; and a Cell Radio Network Temporary Identifier, C-RNTI.

The method according to the first aspect may comprise generating a Packet Data Convergence Protocol, PDCP, packet that conveys the RRC message and that includes the MAC in a header of the PDCP packet.

The method according to the first aspect may comprise receiving an RRC Release message that indicates the wireless device is to release or suspend the RRC connection, wherein the signaling is included in the RRC Release message.

The method may in an embodiment of the first aspect comprise receiving a Non-Access Stratum, NAS, message, wherein the signaling is included in the NAS message.

The signaling is in an embodiment of the first aspect received from a network node and indicates how the wireless device is to generate the MAC for integrity protecting the RRC message that requests resumption of the RRC connection when the network node is a source or target of that resumption.

The signaling is in an embodiment of the first aspect indicating how the wireless device is to generate the MAC for integrity protecting the RRC message that requests a certain target network node or a certain target cell to resume an RRC connection.

The signaling indicates in an embodiment of the first aspect how the wireless device is to generate the MAC for integrity protecting the RRC message that requests resumption of the RRC connection previously established at a certain source network node or a certain source cell.

The method according to the first aspect may comprise: generating an RRC message for requesting a certain target network node or a certain target cell to resume an RRC connection previously established at a certain source network node or a certain source cell; deciding, based at least in part on the received signaling, how the wireless device is to generate the MAC for integrity protecting the generated RRC message; generating the MAC for integrity protecting the generated RRC message, according to said deciding; and transmitting the RRC message and the generated MAC. In that case, the deciding may comprise: determining a source way and a target way based at least in part on the received signaling, wherein the source way is a way that the wireless device is to generate the MAC for the certain source network node or the certain source cell, and wherein the target way is a way that the wireless device is to generate the MAC for the certain target network node or the certain target cell; and deciding how the wireless device is to generate the MAC for integrity protecting the generated RRC message, based on the source way and the target way. According to an embodiment, a first way to generate the MAC is to input a first set of parameters into an integrity algorithm, wherein a second way to generate the MAC is to input a second set of parameters into the integrity algorithm, wherein the second set of parameters includes the first set of parameters as well as one or more additional parameters, and wherein said deciding comprises deciding to generate the MAC using the second way only if both the source way and the target way are each the second way.

The method according to the first aspect may comprise transmitting, from the wireless device, signaling indicating how the wireless device has generated, will generate, or is capable of generating the MAC for integrity protecting the RRC message that requests resumption of the RRC connection.

A second aspect of the invention relates to a method performed by a wireless device for use in a wireless communication system. The method comprises transmitting, from the wireless device, signaling indicating how the wireless device has generated, will generate, or is capable of generating a MAC, for integrity protecting an RRC message that requests resumption of an RRC connection. In an embodiment, the signaling indicates which parameters the wireless device has inputted, will input, or is capable of inputting an integrity algorithm for generating the MAC.

An embodiment of the method according to the second aspect comprises generating a PDCP packet that conveys the RRC message and that includes the MAC in a header of the PDCP packet.

An embodiment of the method according to the second aspect comprises transmitting the RRC message and the generated MAC. The transmitted signaling is included in the transmitted RRC message.

The transmitted signaling is in an embodiment of the method according to the second aspect capability signaling that indicates how the wireless device is capable of generating the MAC for integrity protecting the RRC message that requests resumption of an RRC connection.

The signaling indicates in an embodiment of the first and second aspects that the wireless device is to generate the MAC using a whole RRCResumeRequest message as input to an integrity algorithm.

A third aspect of the invention relates to a method performed by a network node for use in a wireless communication system. The method comprises: transmitting, from the network node to a wireless device, signaling indicating how the wireless device is to generate a MAC, for integrity protecting an RRC message that requests resumption of an RRC connection.

The signaling indicates in an embodiment of the third aspect how the wireless device is to generate the MAC for integrity protecting the RRC message that requests resumption of an RRC connection when the network node is a source or target of that resumption.

The signaling indicates in an embodiment of the third aspect how the wireless device is to generate the MAC for integrity protecting an RRC message that requests a certain target network node or a certain target cell to resume an RRC connection.

The signaling indicates in an embodiment of the third aspect how the wireless device is to generate the MAC for integrity protecting an RRC message that requests resumption of an RRC connection previously established at a certain source network node or a certain source cell.

An embodiment of the method according to the third aspect comprises receiving, from the wireless device, signaling indicating how the wireless device has generated, will generate, or is capable of generating the MAC for integrity protecting the RRC message that requests resumption of the RRC connection.

An embodiment of the method according to the third aspect comprises receiving the RRC message and the MAC.

The method according to the third aspect comprises in an embodiment receiving a PDCP packet that conveys the RRC message and that includes the MAC in a header of the PDCP packet.

The method according to the third aspect comprises in an embodiment transmitting an RRC Release message that indicates the wireless device is to release or suspend the RRC connection, wherein the signaling is included in the RRC Release message.

The method according to the third aspect comprises in an embodiment transmitting an RRC message to the wireless device while the RRC connection is established, or during a procedure for establishing the RRC connection, and wherein the signaling is included in the transmitted RRC message.

The method according to the third aspect comprises in an embodiment transmitting a NAS message, to the wireless terminal wherein the signaling is included in the NAS message.

The signaling may in an embodiment of the first and third aspects indicate which parameters are to be input to an integrity algorithm for generating the MAC.

The signaling according to the method of the first and third aspects may comprise or may be included in System Information. The signaling may in that case be included in a System Information Block1.

A fourth aspect of the invention relates to a method performed by a network node for use in a wireless communication system. The method comprises: receiving, from a wireless device, signaling indicating how the wireless device has generated, will generate, or is capable of generating a MAC for integrity protecting an RRC message that requests resumption of an RRC connection.

In an embodiment of the fourth aspect, the signaling indicates which parameters the wireless device has inputted, will input, or is capable of inputting an integrity algorithm for generating the MAC.

An embodiment of the fourth aspect comprises generating an expected MAC based on the signaling.

An embodiment of the fourth aspect comprises generating a PDCP packet that conveys the RRC message and that includes the MAC in a header of the PDCP packet.

An embodiment of the fourth aspect comprises receiving the RRC message and the MAC, and wherein the receiving signaling is included in the received RRC message.

According to an embodiment of the methods according to the second to fourth aspects, a first way to generate the MAC is to input a first set of parameters into an integrity algorithm, wherein a second way to generate the MAC is to input a second set of parameters into the integrity algorithm, and wherein the signaling indicates: which of the first way or the second way the wireless device has used, will use, or is capable of using to generate the MAC; or that the wireless device has used, will use, or is capable of using the second way to generate the MAC.

In an embodiment of the second to fourth aspects, the first set of parameters is a subset of the second set of parameters.

The first set of parameters includes in an embodiment of the first to fourth aspects one or more of an integrity key, a count, a bearer identity, and an indication of direction of transmission.

The second set of parameters includes in an embodiment of the first to fourth aspects one or more of: a cause field indicating a cause for requesting resumption of the RRC connection; and a C-RNTI.

The signaling according to an embodiment of the second and fourth aspects indicates whether, or that, the wireless device has generated, will generate, or is capable of generating the MAC as a function of one or more of: a cause field indicating a cause for requesting resumption of the RRC connection; and a C-RNTI.

An embodiment of the methods according to the third and fourth aspects comprises receiving the RRC message and the MAC.

The MAC is in an embodiment of the first to fourth aspects a resumeMAC-I.

In an embodiment of the methods of the third and fourth aspects, the received signaling is capability signaling that indicates how the wireless device is capable of generating the MAC for integrity protecting the RRC message that requests resumption of an RRC connection.

An embodiment of the methods according to the third and fourth aspects comprises: receiving the RRC message and the MAC; deciding, based on the received signaling, how to generate an expected MAC; generating the expected MAC based on said deciding; and verifying an integrity of the RRC message using the generated expected MAC and the received MAC.

A wireless device is according to a fifth aspect configured to perform a method according to any one of the first and second aspects including any one of their embodiments.

A sixth aspect relates to a wireless device which comprises a processing circuitry and a memory. The memory contains instructions executable by the processing circuitry whereby the wireless device is configured to perform a method according to any one of the first and second aspects including any one of their embodiments.

A seventh aspect relates to a computer program comprising instructions which, when executed by at least one processor of a wireless device, causes the wireless device to carry out a method according to any one of the first and second aspects including any one of their embodiments.

An eighth aspect relates to a network node configured to perform a method according to any one of the third and fourth aspects including any one of their embodiments.

A ninth aspect relates to a network node which comprises processing circuitry and a memory. The memory contains instructions executable by the processing circuitry whereby the network node is configured to perform a method according to any one of the third and fourth aspects including any one of their embodiments.

The network node is a base station in an embodiment of the ninth aspect. The base station may in that case be a gNB.

The invention also relates to a tenth aspect in the form of a computer program. The Computer program comprises instructions which, when executed by at least one processor of a network node, causes the radio network node to carry out a method according to any one the third and fourth aspects including any one of their embodiments.

An eleventh aspect relates to a carrier containing the computer program of any one of the two computer programs, wherein the carrier is one of an electronic signal, optical signal, radio signal, or computer readable storage medium.

A twelfth aspect of the invention relates to a communication system including a host computer. The host computer comprises: processing circuitry configured to provide user data; and a communication interface configured to forward the user data to a cellular network for transmission to a user equipment, wherein the cellular network comprises a base station having a radio interface and processing circuitry, the base station's processing circuitry configured to perform a method according to any one of the third and fourth aspects including any one of their embodiments.

BRIEF DESCRIPTION OF THE DRAWINGS

FIG. 23 is a flowchart illustrating a method implemented in a communication system, in accordance with one embodiment.

FIG. 25 is a flowchart illustrating a method implemented in a communication system, in accordance with one embodiment.

DETAILED DESCRIPTION

Figure 1:
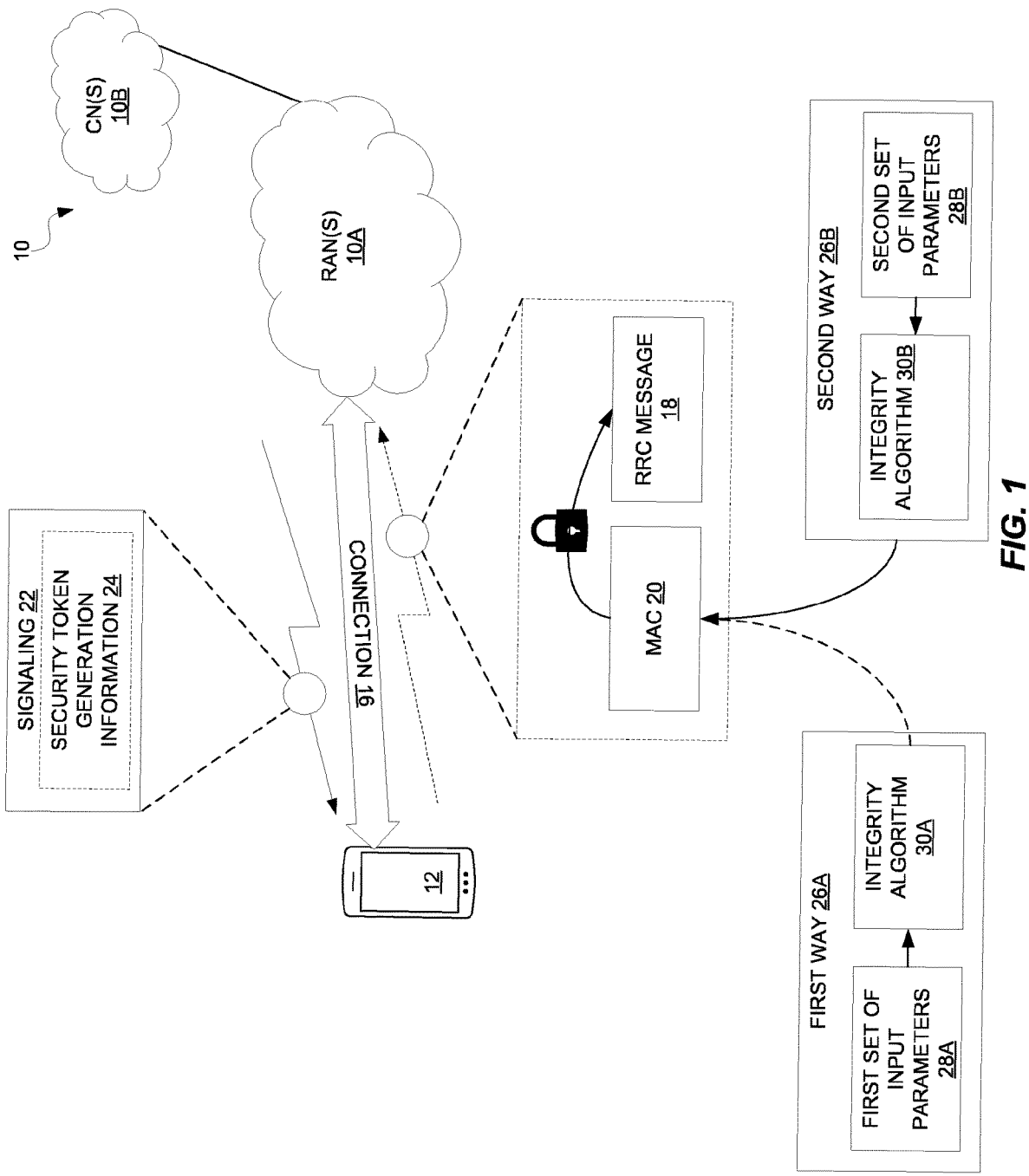
FIG. 1 illustrates a wireless communication system according to some embodiments.

FIG. 1 shows a wireless communication system 10 according to some embodiments. The wireless communication system 10 includes one or more radio access networks (RANs) 10A and one or more core networks (CNs) 10B. The RAN(s) 10A provides radio access to a wireless device 12 and connect the wireless device 12 to the CN(s) 10B. The CN(s) 10B in turn connect the wireless device 12 to one or more external data networks, such as the Internet.

Regardless, the wireless device 12 is shown in FIG. 1 as having a connection 16 (e.g., a radio resource control, RRC, connection) with RAN(s) 10A. The wireless communication system 10 supports suspension of this connection 16, e.g., after a period of inactivity. In some embodiments, suspension of the connection 16 means the radio resources for the connection 16 are released but the context for the connection 16 is preserved to reduce re-connection latency. Alternatively or additionally, suspension of the connection 16 means the wireless device 12 operates in an inactive state, e.g., RRC_INACTIVE as described further down. To effect suspension of the connection 16, the RAN(s) 10A transmits control signalling (not shown) to the wireless device 12 indicating that the connection 16 is to be suspended. The wireless device 12 may correspondingly receive the control signalling and suspend the connection 16 according to the control signalling. The wireless device 12 may at some point later resume the connection 16, at the same or a different attachment point in the RAN(s) 10A, e.g., in the same cell or a different cell, or in the same RAN or even a different RAN. To do so, the wireless device 12 may transmit a request that requests resumption of the connection 16.

The wireless communication system 10 may alternatively or additionally support outright release and re-establishment of the connection 16. The wireless device 12 may similarly transmit a request that requests re-establishment of the connection.

FIG. 1 in this regard generally shows that the wireless device 12 may transmit a message (e.g., an RRC message 18) that requests the resumption or re-establishment of the connection 16. The wireless device 12 also transmits a security token (e.g., a message authentication code 20) for integrity protecting the message. The security token may for instance be transmitted along with or otherwise in association with the message, e.g., including in a Packet Data Convergence Protocol (PDCP) header of a PDCP packet carrying the message. A network node in the RAN(s) 10A that receives the message may correspondingly generate an expected security token (not shown) and compare the received security token with the expected security token in order to verify the integrity of the message.

The wireless device 12 as shown in this regard notably receives signaling 22 indicating how the wireless device 12 is to generate the security token for integrity protecting the message. The signaling 22 for instance includes security token generation information 24. Regardless, the signaling 22 may for example indicate which parameters are to be input to an integrity algorithm for generating the security token or that certain parameters are to be input to an integrity algorithm for generating the security token.

As shown in FIG. 1, for example, there may be a first way 26A and a second way 26B to generate the security token. The first way 26A may involve inputting a first set 28A of input parameters into an integrity algorithm 30A. The second way 26B may involve inputting a second set 28B of input parameters into the same or a different integrity algorithm 30B. In some embodiments, the first set 28A of parameters is a subset (i.e., a proper subset) of the second set 28B of parameters. Alternatively or additionally, the second set 28B of input parameters may include one or more of: (i) a cause field indicating a cause for requesting resumption or re-establishment of the RRC connection; or (ii) a Cell Radio Network Temporary Identifier, C-RNTI. In these and other cases, then, the first way 26A may be a legacy way and the second way 26B may be a new way introduced after the first way 26A. Regardless, the signaling 22 in such embodiments may indicate which of the first way 26A or the second way 26B the wireless device 12 is to use to generate the security token. Or, the signaling 22 may simply indicate that the wireless device 12 is to use the second way 26B to generate the security token 20.

In some embodiments, the signaling 22 is to apply no matter at which network node, cell, or RAN the wireless device 12 requests the resumption or re-establishment of the connection 16. And no matter which network node, cell, or RAN previously suspended or released the connection 16. In other embodiments, though, the signaling 22 explicitly or implicitly applies to a certain target network node, cell, or RAN at which the wireless device 12 requests the resumption or re-establishment of the connection 16 (which may be included in a group of target network nodes, cells, or RANs to which the signaling 22 applies). Alternatively or additionally, the signaling 22 explicitly or implicitly applies to a certain source network node, cell, or RAN that previously suspended or released the connection 16 (which may be included in a group of source network nodes, cells, or RANs to which the signaling 22 applies). In these latter embodiments, then, the wireless device 12 may receive signalling 22 from one or both of (i) the target network node, cell, or RAN at which the wireless device 12 requests the resumption or re-establishment of the connection 16; or (ii) the source network node, cell, or RAN that previously suspended or released the connection 16. Based on at least this signaling 22, the wireless device 12 may determine a way (referred to as a "source way") that the wireless device 12 is to generate the security token for the certain source network node or the certain source cell, and a way (referred to as a "target way") that the wireless device 12 is to generate the security token for the certain target network node or the certain target cell. The wireless device 12 may then decide how the wireless device 12 is to generate the security token for integrity protecting the message 18, based on the source way and the target way. For example, the wireless device may decide to generate the security token 20 using the second way 26B only if both the source way and the target way are each the second way 26B, e.g., only if both the source and the target (source eNB/gNB and the target eNB/gNB) support (or signal to use) the second way 26B. The description below provides a specific example of this approach as "UE++ uses newer version of resumeMAC-I only when source gNB is a source gNB++ and target gNB is a target gNB++. UE++ uses older version of resumeMAC-I when either one of the gNB is older one, i.e., either if source gNB is a source gNB−− or target gNB is a target gNB−−." In this example, then, security token is the MAC 20 in the form of resumeMAC-I, the first way 26A produces the older version of the resumeMAC-I, and the second way 26B produces the newer version of resumeMAC-I.

Figure 2:
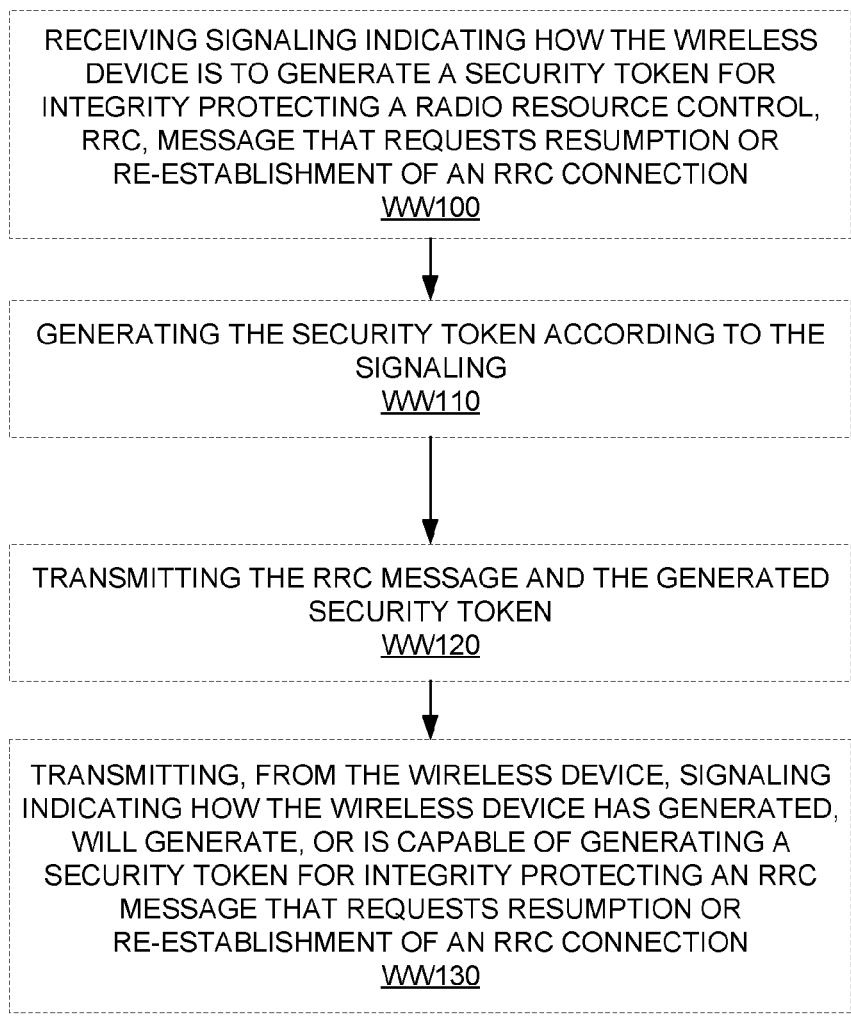
FIG. 2 depicts a method performed by a wireless device according to some embodiments.

In view of the modifications and variations herein, FIG. 2 depicts a method performed by the wireless device 12 configured for use in the wireless communication system 10 in accordance with particular embodiments. The method in some embodiments includes receiving signaling 22 indicating how the wireless device 12 is to generate the security token for integrity protecting an RRC message 18 that requests resumption or re-establishment of an RRC connection 16 (Block VWV100).

In some embodiments, the method includes generating the security token according to the signaling 22 (Block VWV110).

In some embodiments, the method may include transmitting the RRC message 18 and the generated security token (Block VWV120).

In some embodiments, the method alternatively or additionally includes transmitting, from the wireless device 12, signaling indicating how the wireless device 12 has generated, will generate, or is capable of generating a security token for integrity protecting the RRC message 18 that requests resumption or re-establishment of an RRC connection (Block VWV130).

Figure 3:
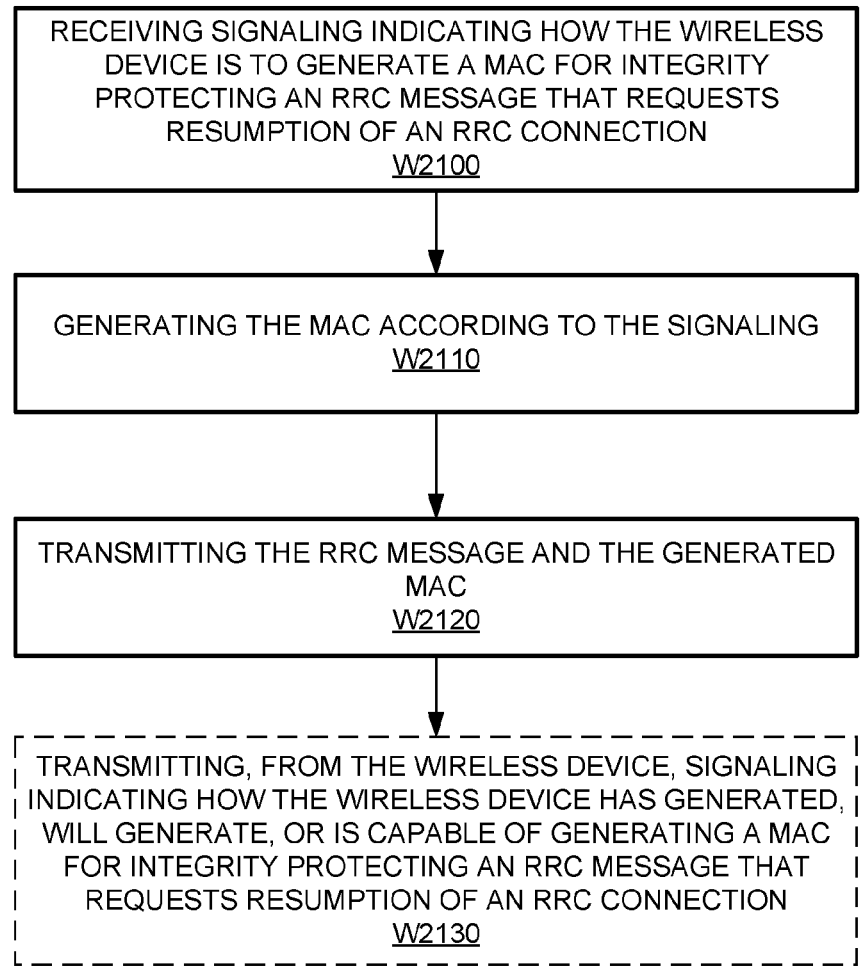
FIG. 3 depicts an embodiment of the method performed by the wireless device.

FIG. 3 depicts an method performed by the wireless device 12 for use in the wireless communication system 10 in accordance with some embodiments of the method of FIG. 2. The method according to FIG. 3 includes receiving signaling 22 indicating how the wireless device 12 is to generate the security token in the form of the MAC 20 for integrity protecting an RRC message 18 that requests resumption of an RRC connection 16 (Block W2100).

The method of FIG. 3 includes generating the MAC 20 according to the signaling 22 (Block W2110).

The method of FIG. 3 includes transmitting the RRC message 18 and the generated MAC 20 (Block W2120).

In some embodiments, the method illustrated in FIG. 3 alternatively or additionally includes transmitting, from the wireless device 12, signaling indicating how the wireless device 12 has generated, will generate, or is capable of generating the MAC 20 for integrity protecting the RRC message 18 that requests resumption of an RRC connection (Block W2130). Note that the transmitting illustrated by Block W2130 may not only happen instead of, but also before, the reception of the signalling 22 illustrated by block W2100.

Figure 4:
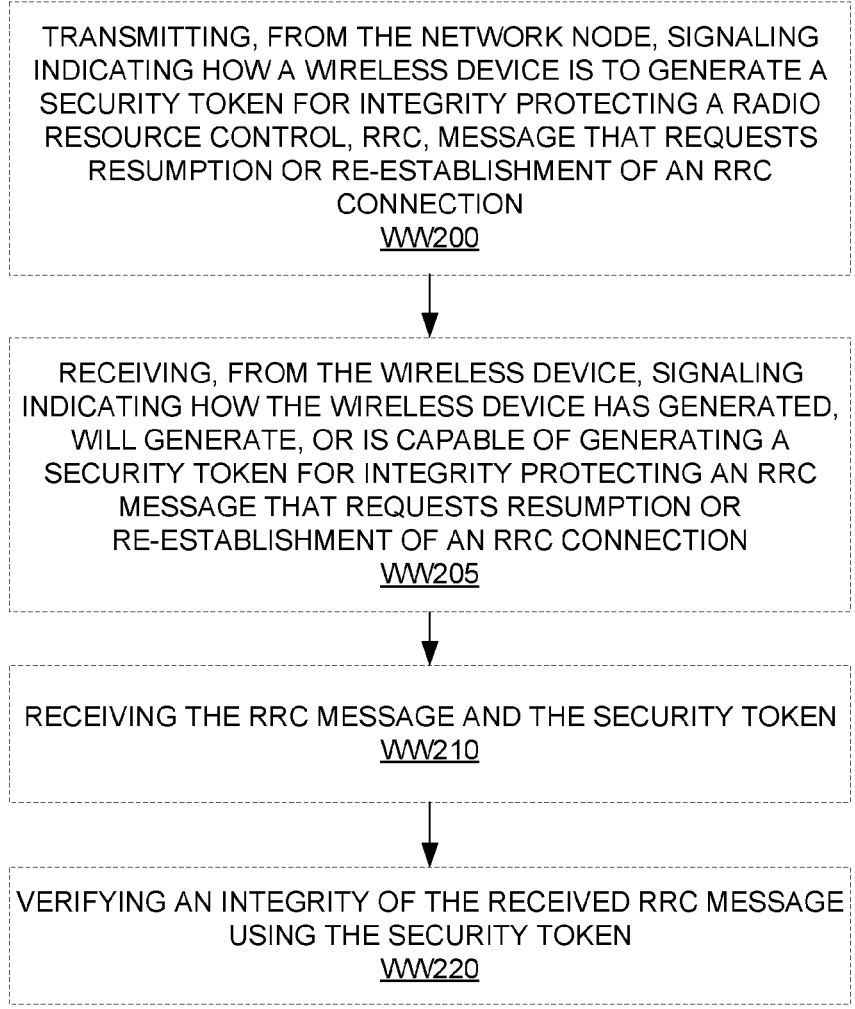
FIG. 4 depicts embodiments of a method performed by a network node.
Figure 7:
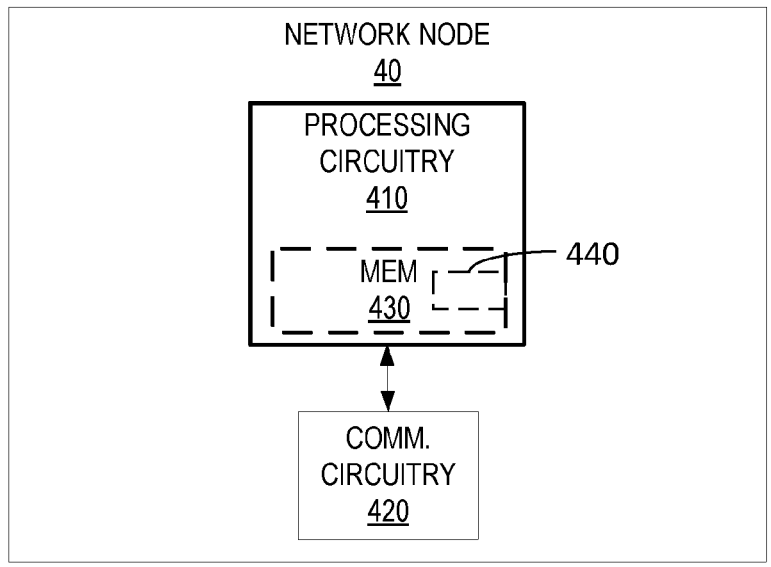
FIG. 7 illustrates a network node as implemented in accordance with one or more embodiments.

FIG. 4 depicts a method performed by a network node 40 (e.g., in the RAN(s) 10A or CN(s) 10B and as seen in FIG. 7) configured for use in the wireless communication system 10 in accordance with other particular embodiments. The method in some embodiments includes transmitting, from the network node 40, the signaling 22 indicating how the wireless device 12 is to generate the security token for integrity protecting the RRC message 18 that requests resumption or re-establishment of an RRC connection (Block WW200).

In some embodiments, the method alternatively or additionally comprises receiving, from the wireless device 12, signaling indicating how the wireless device 12 has generated, will generate, or is capable of generating a security token for integrity protecting the RRC message 18 that requests resumption or re-establishment of an RRC connection (Block WW205).

In some embodiments, the method includes receiving the RRC message 18 and the security token (Block WW210). In some embodiments, the method also includes verifying an integrity of the received RRC message 18 using the security token (Block WW220).

Figure 5:
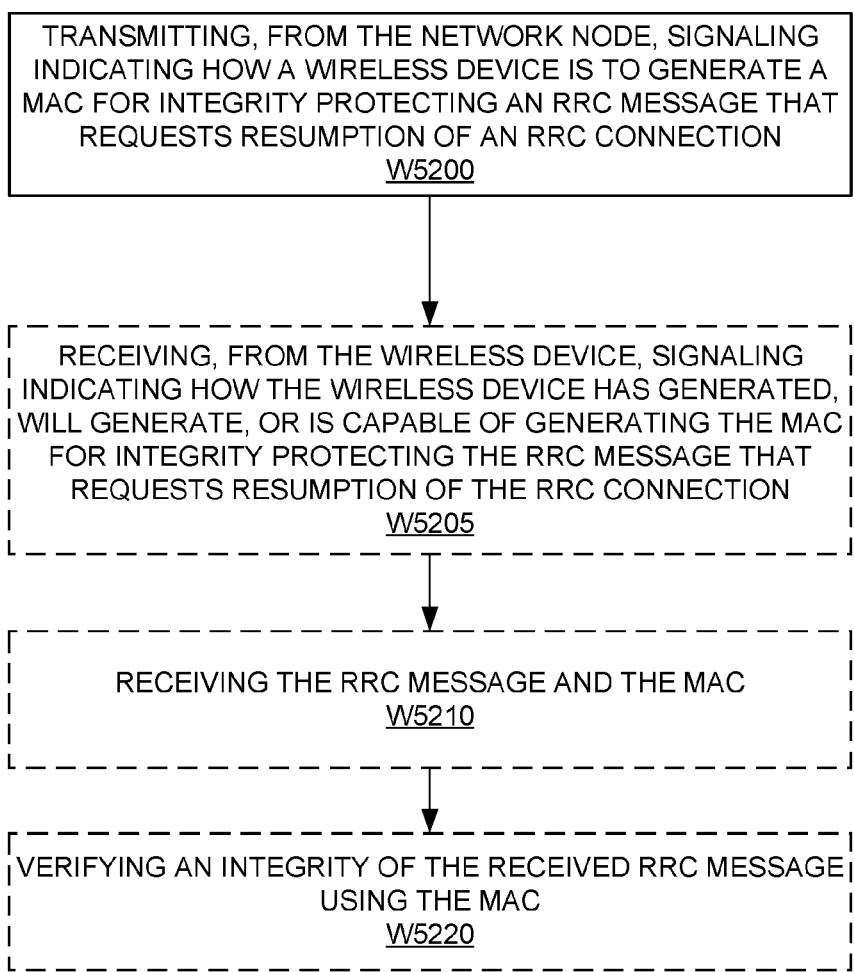
FIG. 5 depicts more specific embodiments of the method illustrated in FIG. 4.

FIG. 5 depicts more specific embodiments of the method illustrated in FIG. 4. Here, the method includes transmitting, from the network node 40, the signaling 22 indicating how the wireless device 12 is to generate the MAC for integrity protecting the RRC message 18 that requests resumption of an RRC connection (Block W5200).

In some embodiments, the method of FIG. 5 alternatively or additionally comprises receiving, from the wireless device 12, signaling indicating how the wireless device 12 has generated, will generate, or is capable of generating a MAC for integrity protecting the RRC message 18 that requests resumption of an RRC connection (Block W5205). Thus note that the receiving of block W5205 may not only happen instead of, but also before, the transmitting illustrated by block W5200.

In some embodiments, the method of FIG. 5 includes receiving the RRC message 18 and the security token (Block W5210). In some embodiments, the method of FIG. 5 also includes verifying an integrity of the received RRC message 18 using the MAC (Block W5220).

Embodiments herein also include corresponding apparatuses. Embodiments herein for instance include a wireless device 12 configured to perform any of the steps of any of the embodiments described above for the wireless device.

Embodiments also include a wireless device 12 comprising processing circuitry and power supply circuitry. The processing circuitry is configured to perform any of the steps of any of the embodiments described above for the wireless device. The power supply circuitry is configured to supply power to the wireless device.

Embodiments further include a wireless device 12 comprising processing circuitry. The processing circuitry is configured to perform any of the steps of any of the embodiments described above for the wireless device. In some embodiments, the wireless device further comprises communication circuitry.

Embodiments further include a wireless device 12 comprising processing circuitry and memory. The memory contains instructions executable by the processing circuitry whereby the wireless device is configured to perform any of the steps of any of the embodiments described above for the wireless device.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a network node configured to perform any of the steps of any of the embodiments described above for the network node.

Embodiments also include a network node comprising processing circuitry and power supply circuitry. The processing circuitry is configured to perform any of the steps of any of the embodiments described above for the network node. The power supply circuitry is configured to supply power to the network node.

Embodiments further include a network node comprising processing circuitry. The processing circuitry is configured to perform any of the steps of any of the embodiments described above for the network node. In some embodiments, the radio network node further comprises communication circuitry.

Embodiments further include a network node comprising processing circuitry and memory. The memory contains instructions executable by the processing circuitry whereby the radio network node is configured to perform any of the steps of any of the embodiments described above for the radio network node.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 6:
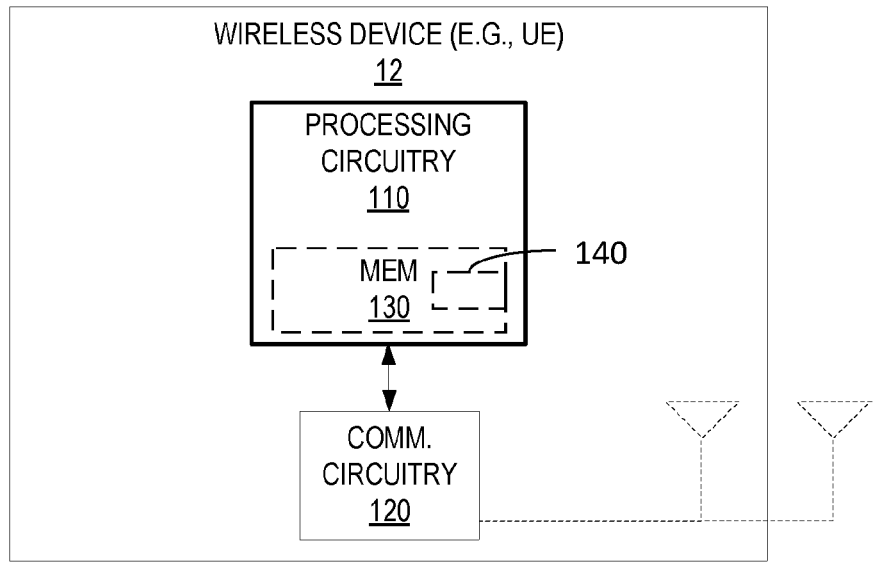
FIG. 6 illustrates a wireless device as implemented in accordance with one or more embodiments.

FIG. 6 for example illustrates the wireless device 12 as implemented in accordance with one or more embodiments. As shown, the wireless device 12 includes processing circuitry 110 and communication circuitry 120. The communication circuitry 120 (e.g., radio circuitry) is configured to transmit and/or receive information to and/or from one or more other nodes, e.g., via any communication technology. Such communication may occur via one or more antennas that are either internal or external to the wireless device 12. The processing circuitry 110 is configured to perform processing described above, e.g., in FIGS. 2 and 3, such as by executing instructions stored in memory 130. The processing circuitry 110 in this regard may implement certain functional means, units, or modules.

FIG. 7 illustrates the network node 40 as implemented in accordance with one or more embodiments. As shown, the network node 40 includes processing circuitry 410 and communication circuitry 420. The communication circuitry 420 is configured to transmit and/or receive information to and/or from one or more other nodes, e.g., via any communication technology. The processing circuitry 410 is configured to perform processing described above, e.g., in conjunction with FIGS. 4 and 5, such as by executing instructions stored in memory 430. The processing circuitry 410 in this regard may implement certain functional means, units, or modules.

Those skilled in the art will also appreciate that embodiments herein further include corresponding computer programs.

A computer program comprises instructions which, when executed on at least one processor of an apparatus, such as the wireless device 12 and the network node 40, cause the apparatus to carry out any of the respective processing described above. A computer program in this regard may comprise one or more code modules or parts corresponding to the means or units described above.

Embodiments further include a carrier containing such a computer program. This carrier may comprise one of an electronic signal, optical signal, radio signal, or computer readable storage medium.

In this regard, embodiments herein also include a computer program, such as a computer program 140 in FIGS. 6 and 440 in FIG. 7, stored on a non-transitory computer readable (storage or recording) medium (e.g. in the form of memory 130 and memory 440, respectively) and comprising instructions that, when executed by a processor of an apparatus, cause the apparatus to perform as described above.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 8:
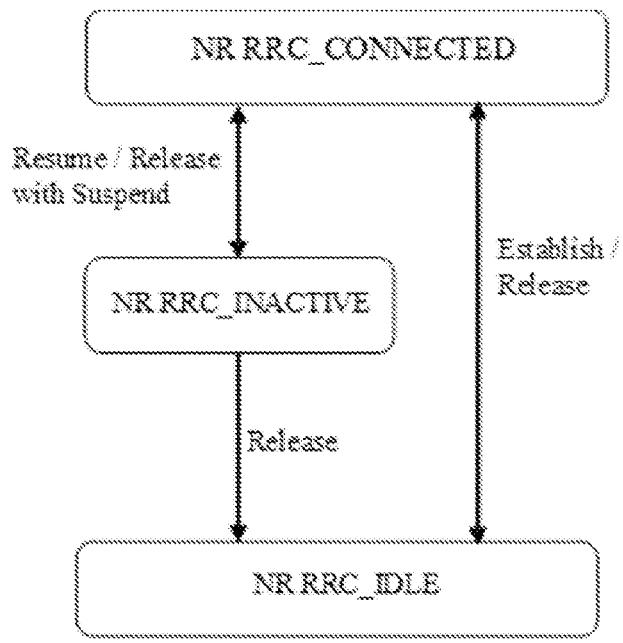
FIG. 8 illustrates User equipment (UE) state machine and state transitions in NR.

RRC connection resume is available in New Radio (NR) and enhanced Long Term Evolution (eLTE). In particularly, the RRC state model is updated in NR (and in eLTE, i.e. LTE connected to the 5G Core, 5GC) as illustrated in FIG. 8 and a new RRC_INACTIVE state is introduced in addition to the existing RRC_IDLE and RRC_CONNECTED states inherited from LTE. In RRC_INACTIVE, the UE context from the previous RRC connection is stored in the radio access network (RAN) and is re-used the next time an RRC connection is established. The UE context includes information such as the UE security configuration, configured radio bearers etc. By storing the UE context in the RAN, one avoids the signaling required for security activation and bearer establishment which is normally required when transitioning from RRC_IDLE to RRC_CONNECTED. This improves latency and reduces the signaling overhead.

Figure 9:
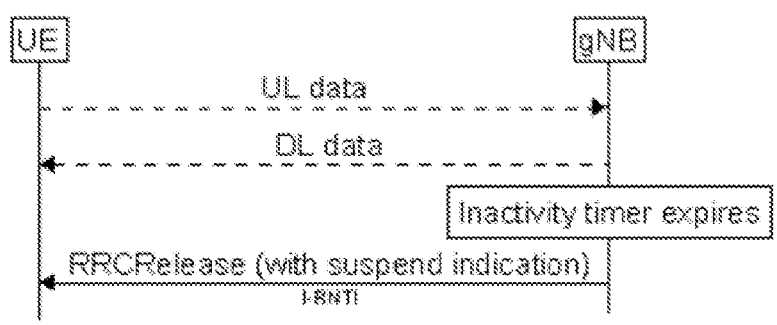
FIG. 9 shows a sequence diagram with the message RRCRelease between a gNB and a UE.

RRC_INACTIVE mode is realized by introducing two new procedures "RRC connection suspend" (also called RRC connection release with SuspendConfig) and "RRC connection resume". The gNB suspends a connection and moves the UE from RRC_CONNECTED to RRC_INACTIVE by sending a RRC release message with suspend indication (or configuration) to the UE, as illustrated in FIG. 9. This may happen for example after the UE has been inactive for a certain period which causes a gNB internal inactivity timer to expire. Both the UE and gNB stores the UE context and the associated identifier (referred to as I-RNTI). It has been recently updated that two identifiers will be configured in the suspend configuration, a long and short I-RNTI. The one to be used in resume depends on an indication from the network in system information of the cell the UE tries to resume in. The two I-RNTI identifiers were introduced to support scenarios when the UE is resuming in a cell which only gives the UE a small scheduling grant for the first UL message. For this purpose, also two different resume messages have been introduced namely RRCResumeRequest and RRCResumeRequest1. However, RRC resume request is used herein to refer to both messages.

At the next transition to RRC_CONNECTED, the UE resumes the connection by sending an RRC resume request including the following information to the gNB which the UE attempts to resume the connection towards (note that it may be another cell/gNB compared to the cell/gNB where the connection was suspended):

The I-RNTI (either the long or short I-RNTI depending on the system information indication).

A security token (a MAC called resumeMAC-I in 3GPP terminology) which is used to identify and verify the UE at RRC connection resume.

An indication of the cause of the resume, e.g. mobile originated data.

Figure 10:
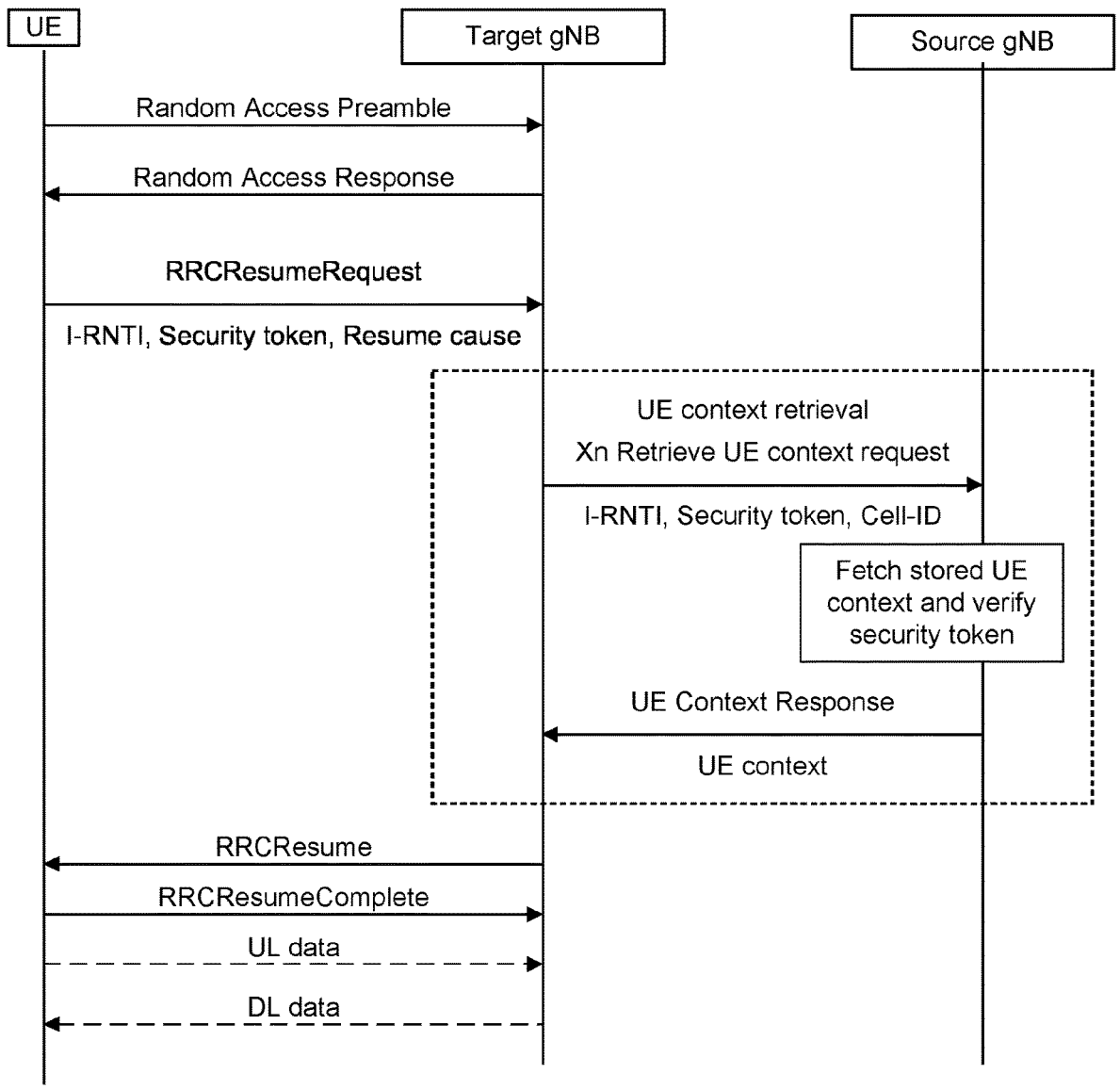
FIG. 10 shows a sequence diagram related to RRCResume.

The gNB which serves the cell in which the UE is resuming is sometimes referred to as the target gNB, while the gNB serving the cell in which the UE was suspended in is sometimes referred to as the source gNB. To resume the connection, the target gNB determines which gNB is the source gNB (considering the gNB part of the I-RNTI) and request that gNB to send the UE's context. In the request the target provides, among other things, the UE ID and security token received from the UE as well as the target cell Cell ID. This is illustrated in FIG. 10.

The source gNB then locates the UE context based on the I-RNTI and verifies the request based on the security token. If successful, the source gNB forwards the UE context to the target gNB, which then responds to the UE with RRC resume to confirm the connection is being resumed. The RRC resume message may also contain configurations to reconfigure the radio bearers being resumed. Finally, the UE acknowledges the reception of the RRC re-establishment by sending RRC re-establishment complete.

Note that the described NR RRC resume procedure works in a similar way in LTE (even though in the state model the UE is considered in RRC_IDLE with a stored context) and eLTE (i.e. when LTE is connected to 5GC).

In NR and in eLTE (LTE connected to 5GC) the RRCResume message in response to an RRCResumeRequest is encrypted and integrity protected. That is done using new security keys, derived based on the stored AS security context. This new key derivation (sort of a key update) is done as part of the resume procedure, in particular as part of the transmission of the RRCResumeRequest (or RRCResumeRequest1).

It is not only the RRCResume message that may be sent in response to the RRCResumeRequest message. In NR and eLTE, after the UE sends an RRC Resume Request kind of message (e.g. RRCResumeRequest or RRCResumeRequest1) the UE may receive a message on Signaling Radio Bearer #1 (SRB1) that should also be encrypted, and integrity protected, as described above:

RRCRelease with suspend configuration moving the UE to RRC_INACTIVE;
RRCRelease without suspend configuration moving the UE to RRC_IDLE;
RRCResume moving the UE to RRC_CONNECTED.

Figure 11:
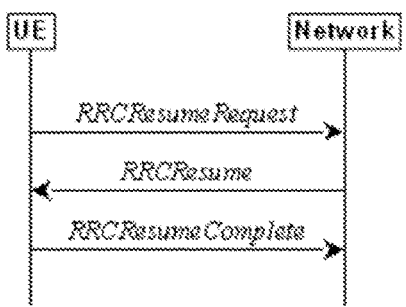
FIG. 11 shows a sequence diagram related to a successful RRC connection resume.
Figure 12:
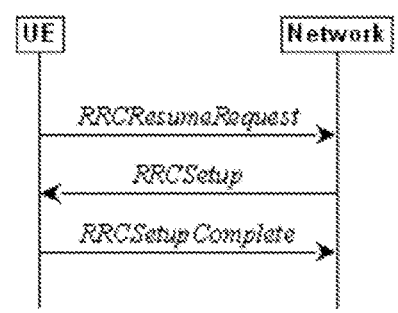
FIG. 12 illustrates successful RRC connection resume fallback to RRC connection establishment.
Figure 13:
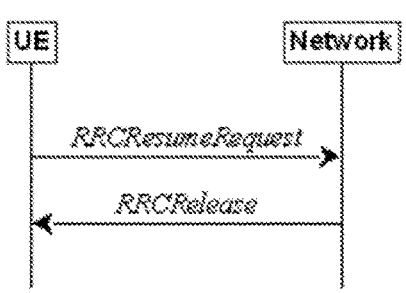
FIG. 13 illustrates a successful RRC connection resume followed by network release.
Figure 14:
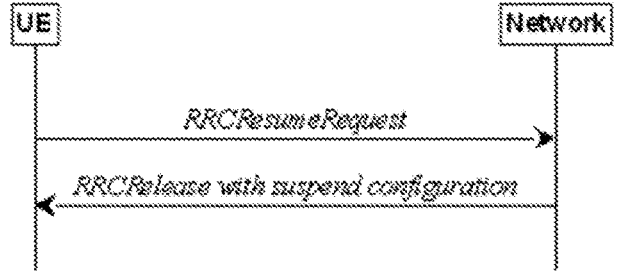
FIG. 14 illustrates a successful RRC connection resume followed by suspend by the network.
Figure 15:
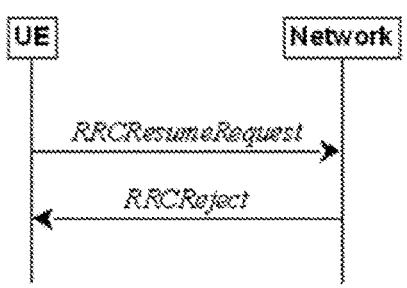
FIG. 15 illustrates an RRC connection resume request from the UE followed by a rejection from the network.

Other messages may also be transmitted, an RRCReject with wait timer or RRCSetup (fallback to RRC_IDLE) but on SRB0 (i.e. not encrypted or integrity protected). All these possible responses are shown as follows:

FIG. 11 illustrates signalling in relation to a successful RRC resume. FIG. 12 illustrates successful RRC connection resume fallback to RRC connection establishment. FIG. 13 illustrates successful RRC connection resume followed by network release. FIG. 14 illustrates a successful RRC connection resume followed by network suspend. FIG. 15 illustrates an RRC connection resume request from the UE followed by a rejection from the network.

In LTE and NR, integrity protection of messages is performed in the Packet Data Convergence Protocol (PDCP) in both the network and the UE by computing a Message Authentication Code-Integrity (MAC-I) which is included in the PDCP header. When the receiver receives the PDCP packet it computes and verifies the MAC-I using the same inputs and algorithms as the transmitter so that each side can be authenticated. The derivations are specified in $3^{rd}$ Generation Partnership Project (3GPP) Technical Specification (TS) 33.401 v. 15.9.0 and TS 33.501 v 15.1.0 (2018-06) for the Evolved Packet System (EPS) and 5G System (5GS) respectively, although the only difference is which algorithms are applied. For E-UTRA connected to either EPC or 5GC, the algorithms used are defined in TS 33.401, while for NR, the algorithms used are defined in 33.501:

Below is an excerpt from TS 33.501 v 15.1.0 (2018-06) for the derivation of the MAC-I:

The input parameters to the integrity algorithm are a 128-bit integrity key named KEY, a 32-bit COUNT, a 5-bit bearer identity called BEARER, the 1-bit indication indicating direction of the transmission i.e. DIRECTION, and the message itself i.e. MESSAGE. The DIRECTION bit shall be 0 for uplink and 1 for downlink. The bit length of the MESSAGE is LENGTH.

Figure 16:
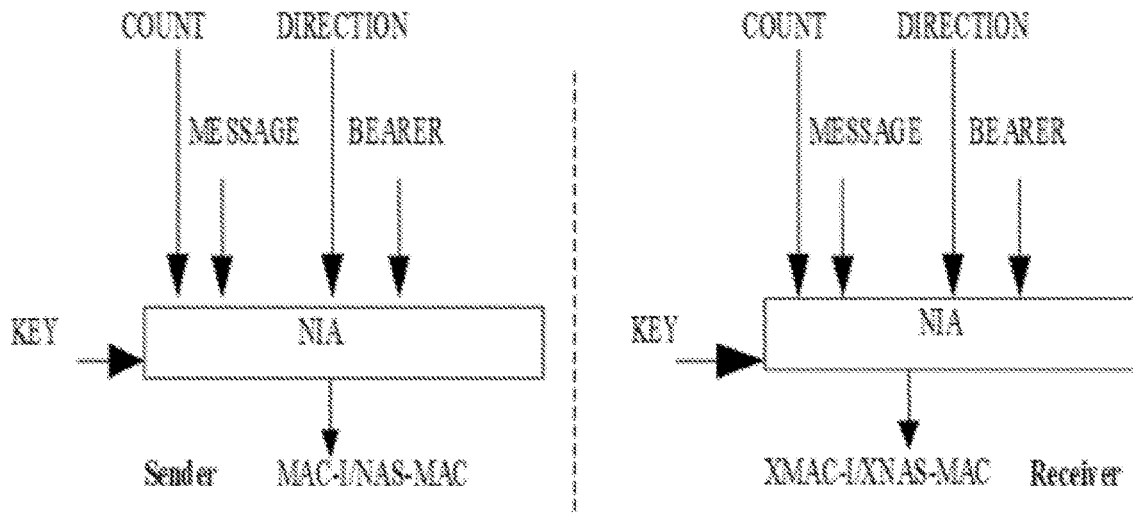
FIG. 16 illustrates derivation of MAC-I/NAS-MAC or XMAC-I/XNAS-MAC.

FIG. 16 illustrates the use of the integrity algorithm NIA to authenticate the integrity of messages.

Based on these input parameters the sender computes a 32-bit message authentication code (MAC-I/NAS-MAC) using the integrity algorithm NIA (Integrity Algorithm for 5G). The message authentication code is then appended to the message when sent. For integrity protection algorithms, the receiver computes the expected message authentication code (XMAC-I/XNAS-MAC) on the message received in the same way as the sender computed its message authentication code on the message sent and verifies the data integrity of the message by comparing it to the received message authentication code, i.e. MAC-I/NAS-MAC.

The integrity protection is always applied for control signaling (RRC messages) and is configurable for user plane messages in NR.

There currently exist certain challenge(s). The state transition as described above suffers from some security problems.

One of the problems follows. Even though the resumeMAC-I field in the RRCResumeRequest or RRCResumeRequest1 message acts as a security token and proves to the gNB that the token was generated by a genuine UE, the RRCResumeRequest or RRCResumeRequest1 message itself is not protected against unauthorized tampering. For example, an attacker could tamper with the resumeCause field in the RRCResumeRequest or RRCResumeRequest1 message and change its value, say, from "highPriorityAccess" to "rna-Update" and trigger unintended consequences. In this example, the unintended consequence would be that the UEs could be sent back to RRC_INACTIVE state instead of transitioning to RRC_CONNECTED state. The practical consequence is then that the use is not able to get services like make calls.

Another problem, commonly known as replay attack, is as follows. The UE could get RRCReject message in response to the RRCResumeRequest or RRCResumeRequest1 message from the gNB. In that case, the UE will resent the same RRCResumeRequest or RRCResumeRequest1 message after some time. The fact that the RRCResumeRequest or RRCResumeRequest1 message is same before and after can be exploited by an attacker. The attacker can capture the RRCResumeRequest message and while the UE is waiting for some time before retransmission, the attacker can send the captured RRCResumeRequest message to another gNB. If that gNB then follows through the rest of resume procedure, then the UE context at the network side will be updated. This means that when the genuine UE retransmits the RRCResumeRequest message after some time, the procedure will fail because the UE still has old context, while the network has a new UE context.

There is also another procedure called the RRC re-establishment procedure (also known as RRC connection re-establishment procedure in 4G). The purpose of that procedure is to re-establish the RRC connection. A UE may initiate the procedure in order to continue the RRC connection and the procedure succeeds if the network is able to find and verify a valid UE context. The security mechanism for this procedure is in many ways similar to the RRC connection resume procedure. The similarities come from the fact that the security token called shortMAC-I that is used in the re-establishment procedure is calculated similarly as resumeMAC-I with just minor differences in the value of the input. Accordingly, the problems described above for the resume procedure are also problems for the re-establishment procedure.

Some techniques could increase security of the resume procedure. These techniques would define newer ways for calculating and verifying the resumeMAC-I field in the RRCResumeRequest or RRCResumeRequest1. It is the UE that calculates new resumeMAC-I and the gNB verifies it. These techniques could include one or more additional inputs to the calculation of the resumeMAC-I. For example, one technique could add the resumeCause field as extra input or use the whole RRCResumeRequest message as input. Doing so would make it harder for the attacker to tamper with that the resumeCause field. Another technique could add the temporary CRNTI (Cell Radio Network Temporary Identifier) as an extra input. This temporary CRNTI is by nature short-lived and changes between resume procedures. Thus, adding it as an extra input will make it harder for the attacker in succeeding to replay any old captured RRCResumeRequest message.

These techniques would have advantages because they increase security in one way or another. However, they are not complete by themselves. The incompleteness comes from the fact that even if new UEs (e.g. from Rel-16 and/or Rel-17 onwards) implement one of these previously defined techniques, legacy UEs (e.g. Rel-15 UEs or UEs from Rel-16 and/or Rel-17 onwards which have not implemented the technique(s)) would still generate an RRCResumeRequest message and its content (e.g. resume cause and resumeMAC-I) in the way as defined in Rel-15.

The implications of this are explained with reference to the following terms:
1. UE-- means legacy UE which calculates older version of the resumeMAC-I field and cannot calculate a newer version of the resumeMAC-I field.
2. UE++ means updated UEs which can calculate the newer version of the resumeMAC-I field. It can also calculate older version of the resumeMAC-I field.
3. Source gNB-- means legacy source gNB which is not aware and not capable of verifying the newer version of the resumeMAC-I field. It can only verify older version of the resumeMAC-I field.
4. Source gNB++ means updated source gNB which is aware and capable of verifying the newer version of the resumeMAC-I field. It can also verify older version of the resumeMAC-I field (a base station that is capable of supporting new UEs (i.e. UEs supporting a set of new features) should also support legacy UEs).
5. Target gNB-- means legacy target gNB which is not aware and not capable of supporting any source gNB in verifying the newer version of the resumeMAC-I field.

It can only support any source gNB in verifying the older version of the resumeMAC-I field.
6. Target gNB++ means updated target gNB which is aware and capable of supporting any source gNB in verifying the newer version of the resumeMAC-I field. It can also support any source gNB in verifying the older version of the resumeMAC-I field.

To address the above mentioned backward compatibility problem, some approaches could provide for the following. UE++ could indicate to source gNB++ that the UE++ supports newer version of resumeMAC-I.

If UE++ sends RRCResumeRequest to target gNB++, Target gNB++ indicates necessary information (like resumeCause and temporary CRNTI) to source gNB++ during context request procedure. Source gNB++ knows that the UE++ supports newer version of resumeMAC-I. Since it also has necessary information, the source gNB++ can verify the newer version of resumeMAC-I.

Otherwise, if UE++ sends RRCResumeRequest to target gNB--, Target gNB-- cannot indicate necessary information (like resumeCause and temporary CRNTI) to source gNB++ during context request procedure. Source gNB++ knows that the UE++ supports newer version of resumeMAC-I. But it does not have necessary information. Therefore, the source gNB++ cannot verify the newer version of resumeMAC-I. Source gNB++ can indicate failure (e.g., rejecting context request procedure). It can also try to do hit-and-trial with all possible values (e.g., all values of resumeCause) and see if any value will correctly verify the resumeMAC-I.

While the above mentioned way of handling the backward compatibility problem would work in some cases, it would not address all scenarios. For example, for the case when UE++ sends RRCResumeRequest to target gNB--, there is a chance that the ongoing procedure does not succeed (e.g. because target gNB-- does not know how to support the computation of new resumeMAC-I) even though the resumeMAC-I is valid. In that case, the network may possibly interpret that as a non-valid UE and either respond with an RRC Setup and build up the context from the beginning, or just ignore the request (upon which timer T319 expires). Both cases will lead the UE to perform a NAS recovery i.e. come back via IDLE and discard the context. These is not the most efficient resource usage in terms of time, signaling, power consumption and computation. Further, for the step when source gNB++ does hit-and-trial with all possible values, that step is not only inelegant and a waste of computations but also a bad security practice. Indeed, although less probable, it cannot be guaranteed that the verification is correct. It is so because there is a low chance that one pair of security key and resumeCause produces the same resumeMAC-I as another pair of security key and resumeCause would. This is known as a chance of collision.

Certain aspects of the present disclosure and their embodiments may provide solutions to these or other challenges. Some embodiments enable the UE and the network to enhance the security of state transition between RRC_INACTIVE and RRC_CONNECTED in a robust way. Some embodiments herein address a specific issue related to backwards compatibility for a feature regarding the calculation of the resume MAC-I, as discussed above.

Certain embodiments may provide one or more of the following technical advantage(s). Some embodiments enable enhanced security that is robust. The robustness comes from the fact that both the UE and the network have deterministic and efficient way of knowing and using the enhanced security.

For simplicity, some embodiments are described with respect to the resume procedure. However, embodiments may extend also to the re-establishment procedure. Similarly, terminologies related to mechanisms in 5G system are used below. However, the teachings are equally applicable to related mechanisms in legacy 4G systems or any future systems.

Some embodiments address backward compatibility in one or more of the ways below.
1. UE++ uses newer version of resumeMAC-I calculation based on receiving an indication from the network that the new version should be used.
2. This indication from the network to the UE++ can be received in different ways as below:
   a. As part of broadcast information either from source gNB++ or target gNB++, for example MIB (master information block), SIB1 (system information block 1) or some other SIBs.
   b. As part of the RRC message from the source gNB++ that sent the UE++ to RRC_INACTIVE state e.g. RRC Release message. That may contain a list of cells for which the UE shall use the new method or, alternatively, a list of cells for which the UE shall not use the new method.
   c. As part of any other RRC message sent to the UE++ when the UE++ is or entering RRC_CONNECTED state, e.g. Random Access Response (RAR), RRC (connection) setup, RRC re-configuration.
   d. As part of any NAS message sent to the UE++. This could work e.g., when the whole system or tracking area support the new version.
3. UE++ uses newer version of resumeMAC-I only when source gNB is a source gNB++ and target gNB is a target gNB++. Advantage of doing this is to avoid wasteful resources as described above, e.g., avoiding procedure failures.
4. UE++ uses older version of resumeMAC-I when either one of the gNB is older one, i.e., either if source gNB is a source gNB-- or target gNB is a target gNB--. This means that the lacking signalling about the capability from either the source gNB and target gNB in an embodiment would be the basis for the UE++ to calculate the older version of resumeMAC-I.
5. Alternatively or additionally, UE++ indicates to the network if it uses older or newer version of resumeMAC-I.
6. This indication from UE++ to the network can be done in different ways as below:
   a. Using spare bit in the RRCResumeRequest message.
   b. Adding a new field in the RRCResumeRequest message.
   c. Using a different type of RRC message, e.g., RRCResumeRequest_newer.
   d. Sending capability as parts of UE capabilities to the network beforehand. In this case the target gNB first identifies the UE by its I-RNTI and retrieves its UE capabilities. Based on that, the target gNB is aware whether the UE is capable of using the new method. If it is capable, the target gNB assumes the UE is using the new method and decodes the resumeMAC-I based on the new method; Otherwise, the target gNB verifies the UE capability and determines that the UE is not capable of the new method and then uses the old method to decode the resumeMAC-I.

Figure 17:
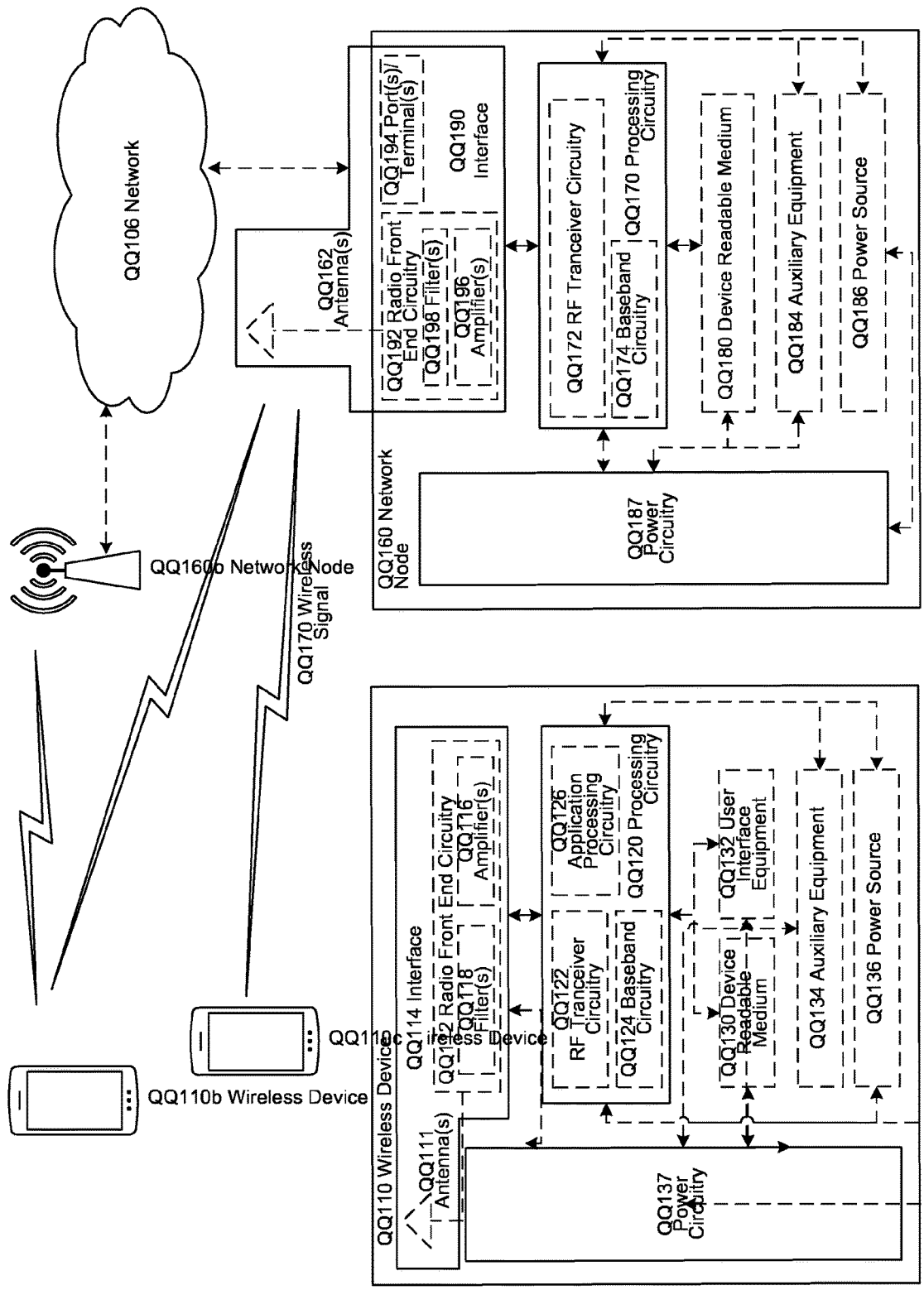
FIG. 17 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 17. For simplicity, the wireless network of FIG. 17 only depicts network QQ106, network nodes QQ160 and QQ160b, and Wireless Devices (WDs) QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In Figure QQ1, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of Figure QQ1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in Figure QQ1 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 18:
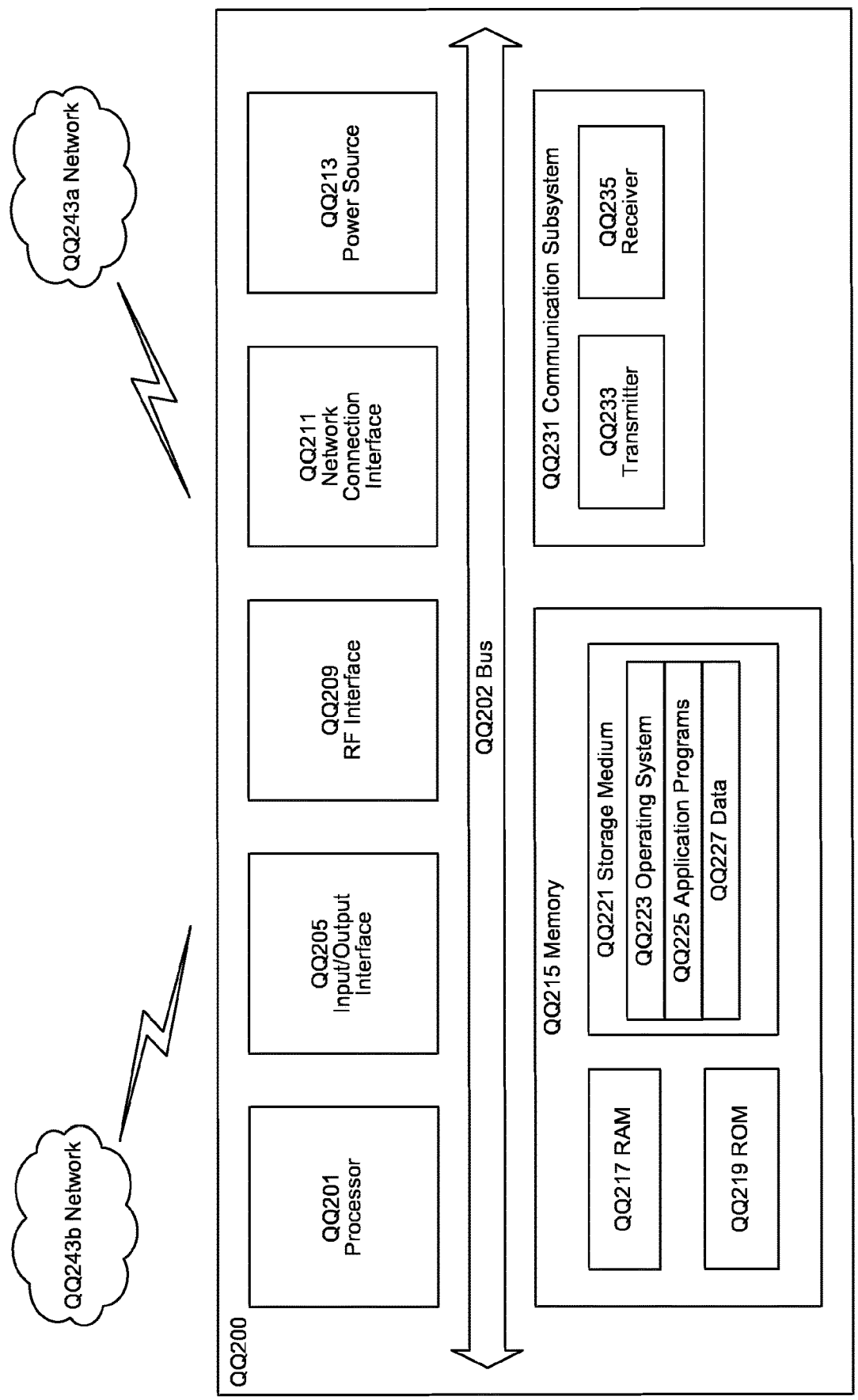
FIG. 18 is a block diagram of a user equipment according to some embodiments.

FIG. 18 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in Figure QQ2, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although Figure QQ2 is a UE, the components discussed herein are equally applicable to a WD, and vice-versa.

In FIG. 18, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in Figure QQ2, or only a subset of the components. The level of integration between the components may vary from one UE to another UE. Further, certain UEs may contain multiple instances of a component, such as multiple processors, memories, transceivers, transmitters, receivers, etc.

In FIG. 18, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 18, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 18, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 19:
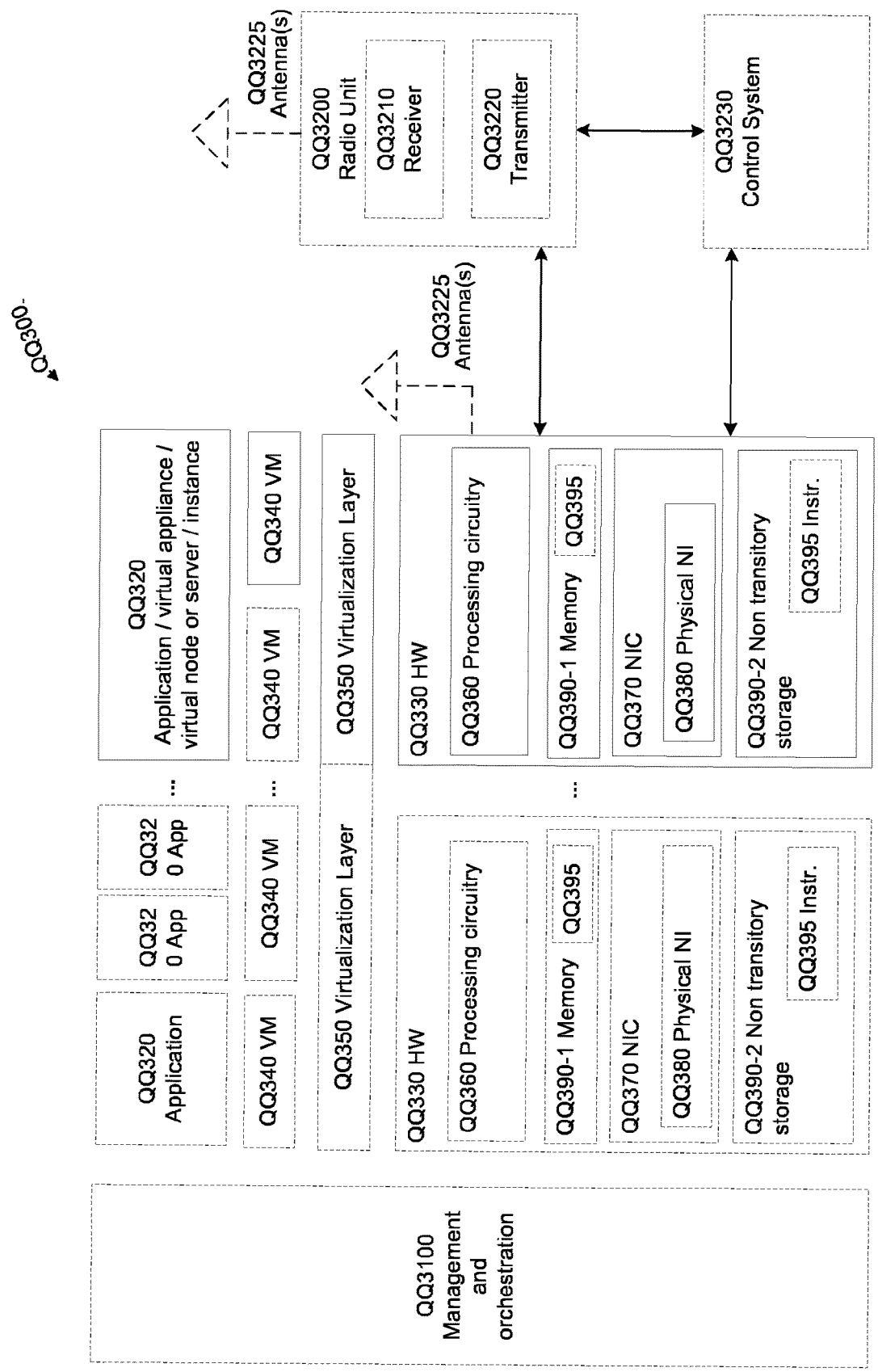
FIG. 19 is a block diagram of a virtualization environment according to some embodiments.

FIG. 19 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 19, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 19.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 20:
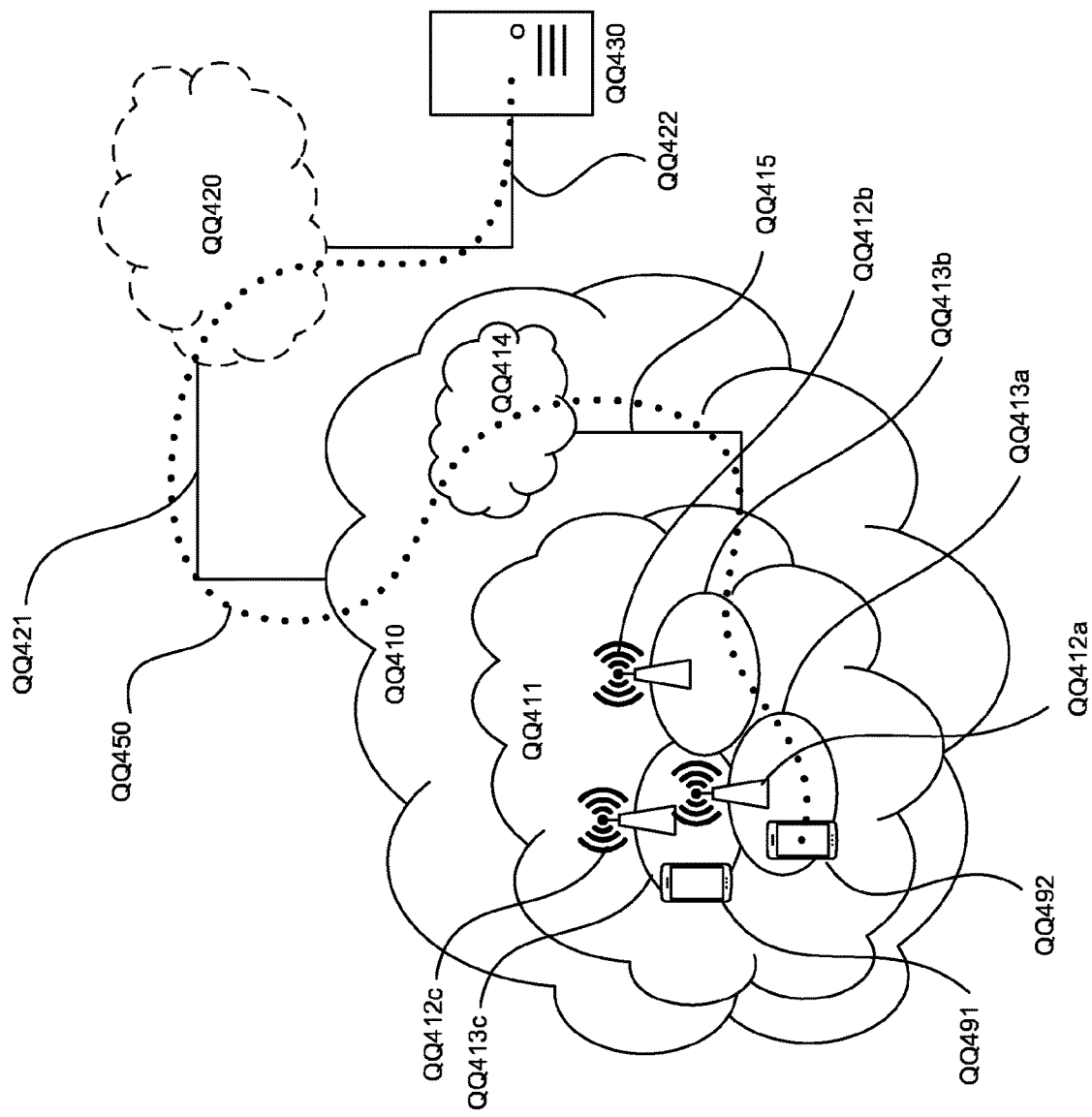
FIG. 20 is a block diagram of a communication network with a host computer according to some embodiments.

FIG. 20 illustrates a telecommunication network connected via an intermediate network to a host computer in accordance with some embodiments. In particular, with reference to FIGURE QQ4, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 20 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 21:
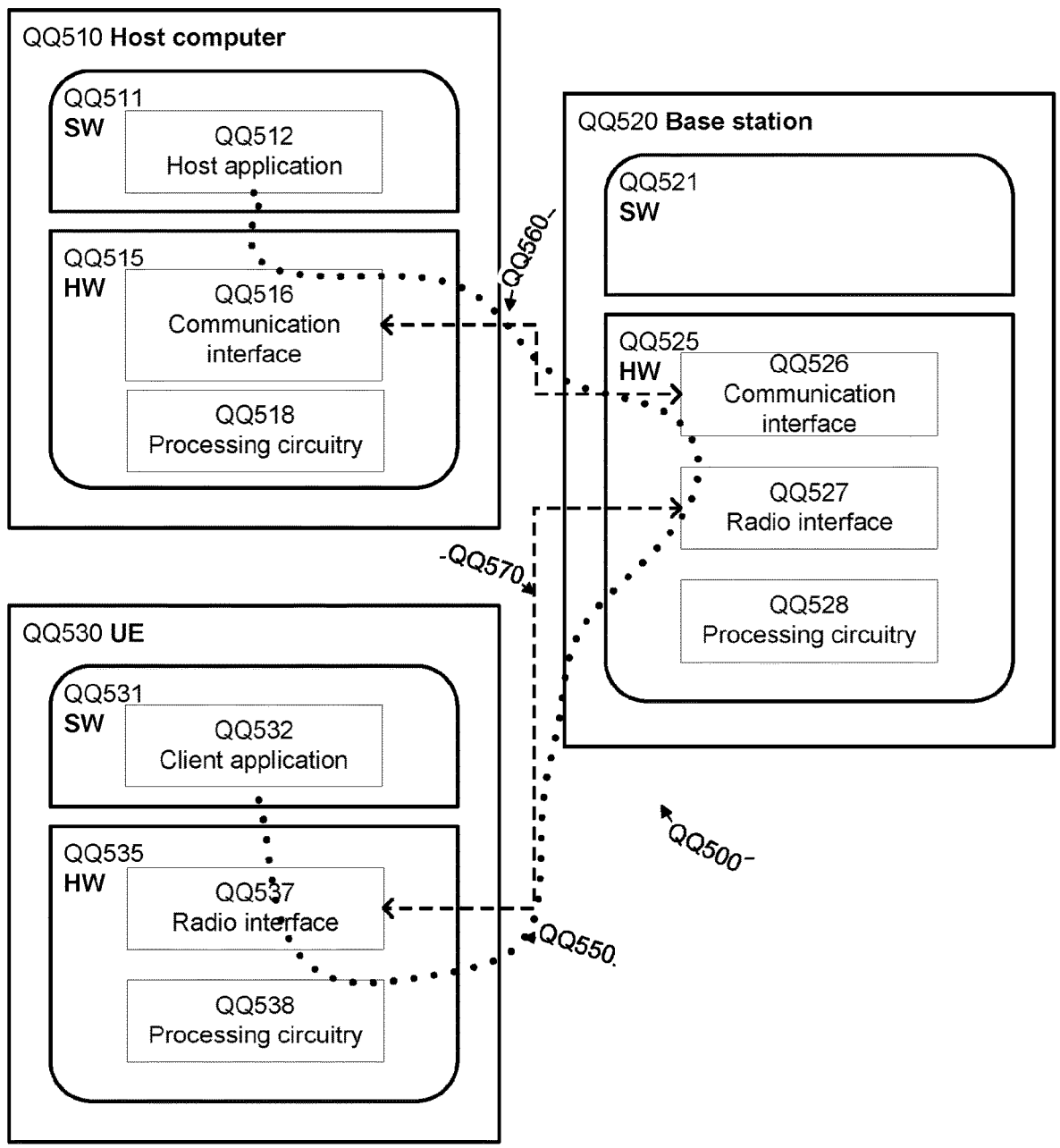
FIG. 21 is a block diagram of a host computer according to some embodiments.

Example implementations, in accordance with an embodiment, of the UE, base station and host computer discussed in the preceding paragraphs will now be described with reference to FIG. 21. FIG. 21 illustrates host computer communicating via a base station with a user equipment over a partially wireless connection in accordance with some embodiments In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in Figure QQ5) served by base station QQ520.

Communication interface QQ526 may be configured to facilitate connection QQ560 to host computer QQ510. Connection QQ560 may be direct or it may pass through a core network (not shown in Figure QQ5) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in Figure QQ5 may be similar or identical to host computer QQ430, one of base stations QQ412a, QQ412b, QQ412c and one of UEs QQ491, QQ492 of Figure QQ4, respectively. This is to say, the inner workings of these entities may be as shown in FIG. 21 and independently, the surrounding network topology may be that of FIG. 20.

In FIG. 21, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 22:
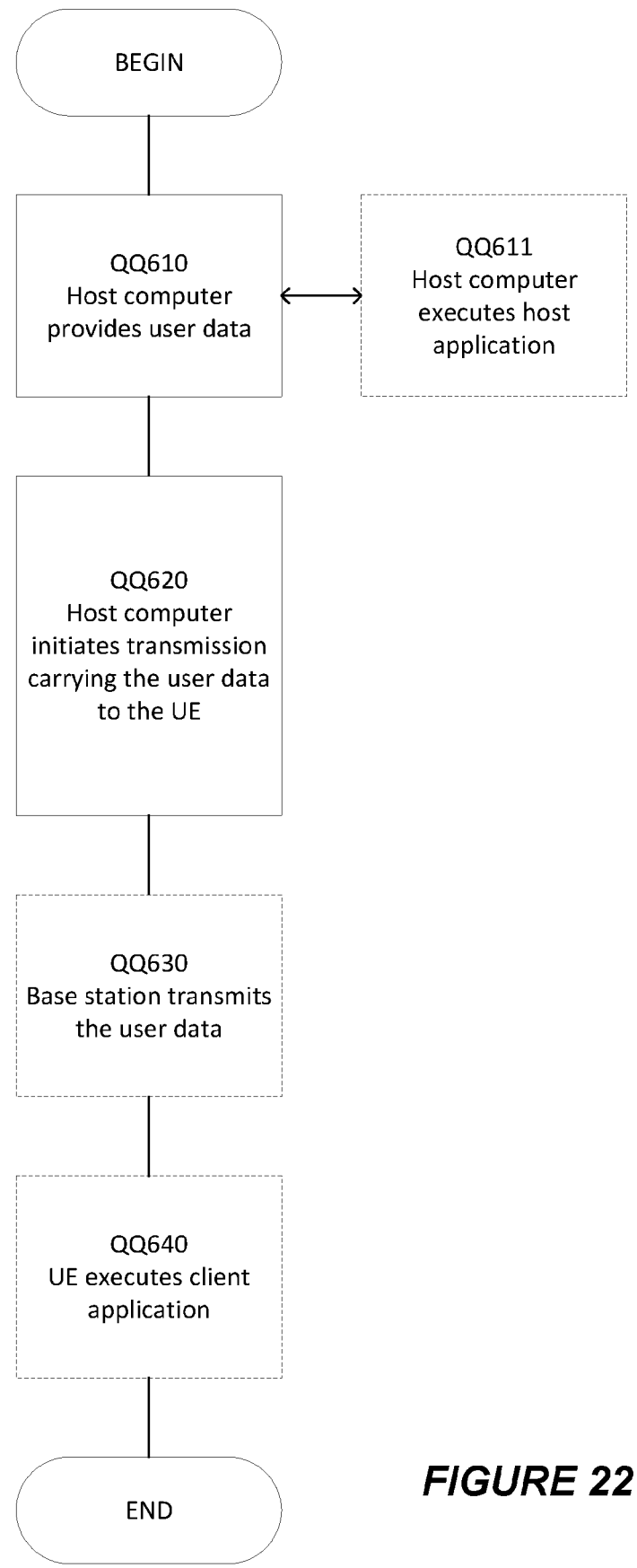
FIG. 22 is a flowchart illustrating a method implemented in a communication system, in accordance with one embodiment.

FIG. 22 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to Figure QQ6 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 23 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to Figure QQ7 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 24:
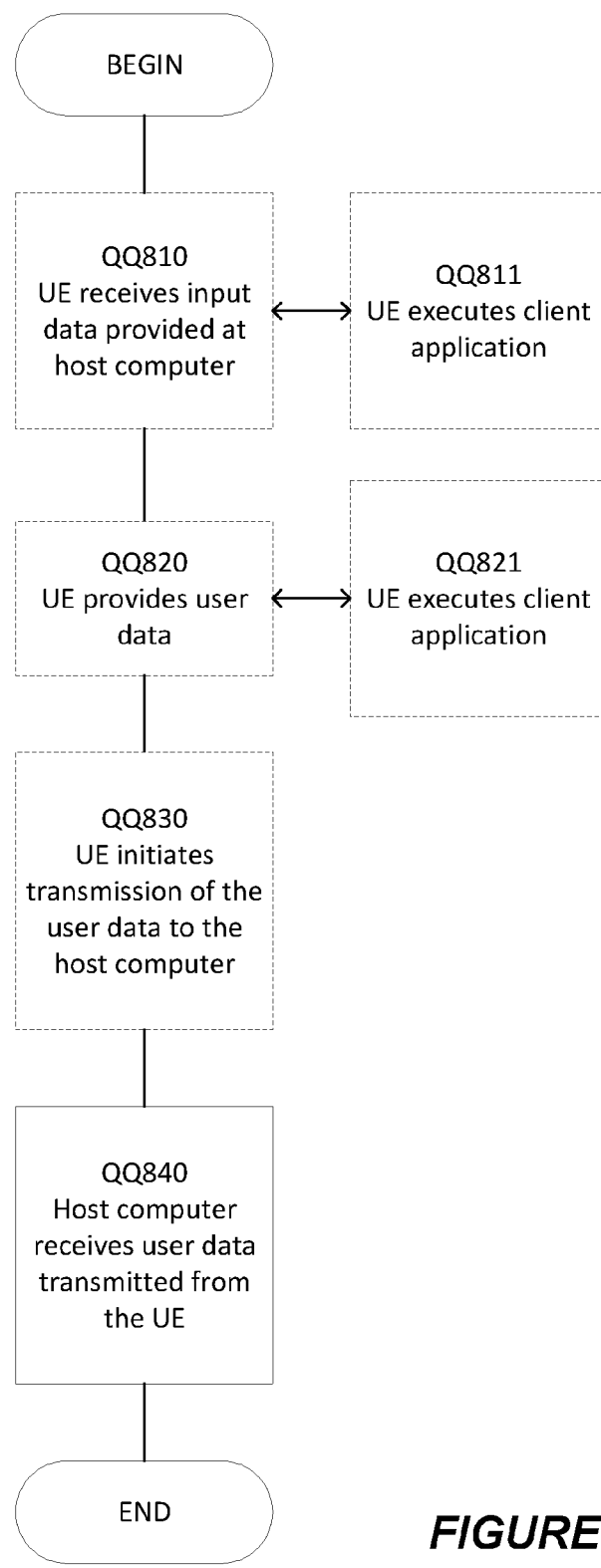
FIG. 24 is a flowchart illustrating a method implemented in a communication system, in accordance with one embodiment.

FIG. 24 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to Figure QQ8 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 25 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to Figure QQ9 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

EXEMPLARY EMBODIMENTS

Group A Embodiments

A1. A method performed by a wireless device configured for use in a wireless communication system, the method comprising:
  receiving signaling indicating how the wireless device is to generate a security token for integrity protecting a Radio Resource Control, RRC, message that requests resumption or re-establishment of an RRC connection.

A2. The method of embodiment A1, wherein the signaling indicates which parameters are to be input to an integrity algorithm for generating the security token or that certain parameters are to be input to an integrity algorithm for generating the security token.

A3. The method of any of embodiments A1-A2, wherein a first way to generate the security token is to input a first set of parameters into an integrity algorithm, wherein a second way to generate the security token is to input a second set of parameters into the same or a different integrity algorithm, and wherein the signaling indicates:
  which of the first way or the second way the wireless device is to use to generate the security token; or
  that the wireless device is to use the second way to generate the security token.

A4. The method of embodiment A3, wherein the first set of parameters is a subset of the second set of parameters.

A5. The method of any of embodiments A3-A4, wherein the first set of parameters includes one or more of an integrity key, a count, a bearer identity, and a direction of transmission.

A6. The method of any of embodiments A3-A5, wherein the second set of parameters includes one or more of:
  a cause field indicating a cause for requesting resumption or re-establishment of the RRC connection; or
  a Cell Radio Network Temporary Identifier, C-RNTI.

A7. The method of any of embodiments A1-A6, wherein the signaling indicates whether, or that, the wireless device is to generate the security token as a function of one or more of:
   a cause field indicating a cause for requesting resumption or re-establishment of the RRC connection; or
   a Cell Radio Network Temporary Identifier, C-RNTI.
A8. The method of any of embodiments A1-A7, further comprising generating the security token according to the signaling.
A9. The method of any of embodiments A1-A8, further comprising transmitting the RRC message and the generated security token.
A10. The method of any of embodiments A1-A9, wherein the security token is a message authentication code.
A11. The method of any of embodiments A1-A10, further comprising generating a Packet Data Convergence Protocol, PDCP, packet that conveys the RRC message and that includes the security token in a header of the PDCP packet.
A12. The method of any of embodiments A1-A11, wherein the signaling comprises or is included in System Information.
A13. The method of any of embodiments A1-A11, further comprising receiving an RRC Release message that indicates the wireless device is to release or suspend the RRC connection, wherein the signaling is included in the RRC Release message.
A14. The method of any of embodiments A1-A11, further comprising receiving an RRC message while the RRC connection is established, or during a procedure for establishing the RRC connection, and wherein the signaling is included in the received RRC message.
A15. The method of any of embodiments A1-A11, further comprising receiving a Non-Access Stratum, NAS, message, wherein the signaling is included in the NAS message.
A16. The method of any of embodiments A1-A15, wherein the RRC message requests resumption of the RRC connection.
A17. The method of any of embodiments A1-A16, wherein the security token is a resumeMAC-I.
A18. The method of any of embodiments A1-A17, wherein the signaling is received from a network node and indicates how the wireless device is to generate a security token for integrity protecting an RRC message that requests resumption or re-establishment of an RRC connection when the network node is a source or target of that resumption or re-establishment.
A19. The method of any of embodiments A1-A18, wherein the signaling indicates how the wireless device is to generate a security token for integrity protecting an RRC message that requests a certain target network node or a certain target cell to resume or re-establish an RRC connection.
A20. The method of any of embodiments A1-A19, wherein the signaling indicates how the wireless device is to generate a security token for integrity protecting an RRC message that requests resumption or re-establishment of an RRC connection previously established at a certain source network node or a certain source cell.
A21. The method of any of embodiments A1-A20, further comprising:
   generating an RRC message for requesting a certain target network node or a certain target cell to resume or re-establish an RRC connection previously established at a certain source network node or a certain source cell;
   deciding, based at least in part on the received signaling, how the wireless device is to generate a security token for integrity protecting the generated RRC message;
   generating the security token for integrity protecting the generated RRC message, according to said deciding; and
   transmitting the RRC message and the generated security token.
A22. The method of embodiment A21, wherein said deciding comprises:
   determining a source way and a target way based at least in part on the received signaling, wherein the source way is a way that the wireless device is to generate the security token for the certain source network node or the certain source cell, and wherein the target way is a way that the wireless device is to generate the security token for the certain target network node or the certain target cell; and
   deciding how the wireless device is to generate the security token for integrity protecting the generated RRC message, based on the source way and the target way.
A23. The method of embodiment A22, wherein a first way to generate the security token is to input a first set of parameters into an integrity algorithm, wherein a second way to generate the security token is to input a second set of parameters into the integrity algorithm, wherein the second set of parameters includes the first set of parameters as well as one or more additional parameters, and wherein said deciding comprises deciding to generate the security token using the second way only if both the source way and the target way are each the second way.
A24. The method of any of embodiments A1-A23, further comprising transmitting, from the wireless device, signaling indicating how the wireless device has generated, will generate, or is capable of generating a security token for integrity protecting an RRC message that requests resumption or re-establishment of an RRC connection.
A25. The method of embodiment A24, further comprising transmitting the RRC message and the generated security token, and wherein the transmitted signaling is included in the transmitted RRC message.
A26. The method of embodiment A24, wherein the transmitted signaling is capability signaling that indicating how the wireless device is capable of generating a security token for integrity protecting an RRC message that requests resumption or re-establishment of an RRC connection.

Group AA Embodiments

AA1. A method performed by a wireless device configured for use in a wireless communication system, the method comprising:
   transmitting, from the wireless device, signaling indicating how the wireless device has generated, will generate, or is capable of generating a security token for integrity protecting a Radio Resource Control, RRC, message that requests resumption or re-establishment of an RRC connection.

AA2. The method of embodiment AA1, wherein the signaling indicates which parameters the wireless device has inputted, will input, or is capable of inputting an integrity algorithm for generating the security token.

AA3. The method of any of embodiments AA1-AA2, wherein a first way to generate the security token is to input a first set of parameters into an integrity algorithm, wherein a second way to generate the security token is to input a second set of parameters into the integrity algorithm, and wherein the signaling indicates:
which of the first way or the second way the wireless device has used, will use, or is capable of using to generate the security token; or
that the wireless device has used, will use, or is capable of using the second way to generate the security token.

AA4. The method of embodiment AA3, wherein the first set of parameters is a subset of the second set of parameters.

AA5. The method of any of embodiments AA3-AA4, wherein the first set of parameters includes one or more of an integrity key, a count, a bearer identity, and a direction of transmission.

AA6. The method of any of embodiments AA3-AA5, wherein the second set of parameters includes one or more of:
a cause field indicating a cause for requesting resumption or re-establishment of the RRC connection; or
a Cell Radio Network Temporary Identifier, C-RNTI.

AA7. The method of any of embodiments AA1-AA6, wherein the signaling indicates whether, or that, the wireless device has generated, will generate, or is capable of generating the security token as a function of one or more of:
a cause field indicating a cause for requesting resumption or re-establishment of the RRC connection; or
a Cell Radio Network Temporary Identifier, C-RNTI.

AA8. The method of any of embodiments AA1-AA7, further comprising generating the security token according to the signaling.

AA9. The method of any of embodiments AA1-AA8, further comprising transmitting the RRC message and the generated security token.

AA10. The method of any of embodiments AA1-AA9, wherein the security token is a message authentication code.

AA11. The method of any of embodiments AA1-AA10, further comprising generating a Packet Data Convergence Protocol, PDCP, packet that conveys the RRC message and that includes the security token in a header of the PDCP packet.

AA12. The method of any of embodiments AA1-AA11, wherein the security token is a resumeMAC-I.

AA13. The method of any of embodiments AA1-AA12, further comprising transmitting the RRC message and the generated security token, and wherein the transmitted signaling is included in the transmitted RRC message.

AA14. The method of any of embodiments AA1-AA13, wherein the transmitted signaling is capability signaling that indicating how the wireless device is capable of generating a security token for integrity protecting an RRC message that requests resumption or re-establishment of an RRC connection.

AA. The method of any of the previous embodiments, further comprising:
providing user data; and
forwarding the user data to a host computer via the transmission to a base station.

Group B Embodiments

B1. A method performed by a network node configured for use in a wireless communication system, the method comprising:
transmitting, from the network node, signaling indicating how a wireless device is to generate a security token for integrity protecting a Radio Resource Control, RRC, message that requests resumption or re-establishment of an RRC connection.

B2. The method of embodiment B1, wherein the signaling indicates which parameters are to be input to an integrity algorithm for generating the security token or that certain parameters are to be input to an integrity algorithm for generating the security token.

B3. The method of any of embodiments B1-B2, wherein a first way to generate the security token is to input a first set of parameters into an integrity algorithm, wherein a second way to generate the security token is to input a second set of parameters into the integrity algorithm, and wherein the signaling indicates:
which of the first way or the second way the wireless device is to use to generate the security token; or
that the wireless device is to use the second way to generate the security token.

B4. The method of embodiment B3, wherein the first set of parameters is a subset of the second set of parameters.

B5. The method of any of embodiments B3-B4, wherein the first set of parameters includes one or more of an integrity key, a count, a bearer identity, and a direction of transmission.

B6. The method of any of embodiments B3-B5, wherein the second set of parameters includes one or more of:
a cause field indicating a cause for requesting resumption or re-establishment of the RRC connection; or
a Cell Radio Network Temporary Identifier, C-RNTI.

B7. The method of any of embodiments B1-B6, wherein the signaling indicates whether, or that, the wireless device is to generate the security token as a function of one or more of:
a cause field indicating a cause for requesting resumption or re-establishment of the RRC connection; or
a Cell Radio Network Temporary Identifier, C-RNTI.

B8. The method of any of embodiments B1-B7, further comprising receiving the RRC message and the security token.

B9. The method of embodiment B8, further comprising verifying an integrity of the received RRC message using the security token.

B10. The method of any of embodiments B1-B9, wherein the security token is a message authentication code.

B11. The method of any of embodiments B1-B10, further comprising receiving a Packet Data Convergence Protocol, PDCP, packet that conveys the RRC message and that includes the security token in a header of the PDCP packet.

B12. The method of any of embodiments B1-B11, wherein the signaling comprises or is included in System Information.

B13. The method of any of embodiments B1-B11, further comprising transmitting an RRC Release message that indicates the wireless device is to release or suspend the RRC connection, wherein the signaling is included in the RRC Release message.

B14. The method of any of embodiments B1-B11, further comprising transmitting an RRC message while the RRC connection is established, or during a procedure for establishing the RRC connection, and wherein the signaling is included in the received RRC message.

B15. The method of any of embodiments B1-B11, further comprising transmitting a Non-Access Stratum, NAS, message, wherein the signaling is included in the NAS message.

B16. The method of any of embodiments B1-B15, wherein the RRC message requests resumption of the RRC connection.

B17. The method of any of embodiments B1-B16, wherein the security token is a resumeMAC-I.

B18. The method of any of embodiments B1-B17, wherein the signaling indicates how the wireless device is to generate a security token for integrity protecting an RRC message that requests resumption or re-establishment of an RRC connection when the network node is a source or target of that resumption or re-establishment.

B19. The method of any of embodiments B1-B18, wherein the signaling indicates how the wireless device is to generate a security token for integrity protecting an RRC message that requests a certain target network node or a certain target cell to resume or re-establish an RRC connection.

B20. The method of any of embodiments B1-B19, wherein the signaling indicates how the wireless device is to generate a security token for integrity protecting an RRC message that requests resumption or re-establishment of an RRC connection previously established at a certain source network node or a certain source cell.

B21. The method of any of embodiments B1-B20, further comprising receiving, from the wireless device, signaling indicating how the wireless device has generated, will generate, or is capable of generating a security token for integrity protecting an RRC message that requests resumption or re-establishment of an RRC connection.

B22. The method of embodiment B21, further comprising receiving the RRC message and the security token, and wherein the receiving signaling is included in the received RRC message.

B23. The method of embodiment B21, wherein the received signaling is capability signaling that indicates how the wireless device is capable of generating a security token for integrity protecting an RRC message that requests resumption or re-establishment of an RRC connection.

B24. The method of any of embodiments B21-B23, further comprising:
  receiving the RRC message and the security token;
  deciding, based on the received signaling, how to generate an expected security token;
  generating the expected security token based on said deciding; and
  verifying an integrity of the RRC message using the generated expected security token and the received security token.

Group BB Embodiments

BB1. A method performed by a network node configured for use in a wireless communication system, the method comprising:
  receiving, from a wireless device, signaling indicating how the wireless device has generated, will generate, or is capable of generating a security token for integrity protecting a Radio Resource Control, RRC, message that requests resumption or re-establishment of an RRC connection.

BB2. The method of embodiment BB1, wherein the signaling indicates which parameters the wireless device has inputted, will input, or is capable of inputting an integrity algorithm for generating the security token.

BB3. The method of any of embodiments BB1-BB2, wherein a first way to generate the security token is to input a first set of parameters into an integrity algorithm, wherein a second way to generate the security token is to input a second set of parameters into the integrity algorithm, and wherein the signaling indicates:
  which of the first way or the second way the wireless device has used, will use, or is capable of using to generate the security token; or
  that the wireless device has used, will use, or is capable of using the second way to generate the security token.

BB4. The method of embodiment BB3, wherein the first set of parameters is a subset of the second set of parameters.

BB5. The method of any of embodiments BB3-BB4, wherein the first set of parameters includes one or more of an integrity key, a count, a bearer identity, and a direction of transmission.

BB6. The method of any of embodiments BB3-BB5, wherein the second set of parameters includes one or more of:
  a cause field indicating a cause for requesting resumption or re-establishment of the RRC connection; or
  a Cell Radio Network Temporary Identifier, C-RNTI.

BB7. The method of any of embodiments BB1-BB6, wherein the signaling indicates whether, or that, the wireless device has generated, will generate, or is capable of generating the security token as a function of one or more of:
  a cause field indicating a cause for requesting resumption or re-establishment of the RRC connection; or
  a Cell Radio Network Temporary Identifier, C-RNTI.

BB8. The method of any of embodiments BB1-BB7, further comprising generating an expected security token based on the signaling.

BB9. The method of any of embodiments BB1-BB8, further comprising receiving the RRC message and the security token.

BB10. The method of any of embodiments BB1-BB9, wherein the security token is a message authentication code.

BB11. The method of any of embodiments BB1-BB10, further comprising generating a Packet Data Convergence Protocol, PDCP, packet that conveys the RRC message and that includes the security token in a header of the PDCP packet.

BB12. The method of any of embodiments BB1-BB11, wherein the security token is a resumeMAC-I.

BB13. The method of any of embodiments BB1-BB12, further comprising receiving the RRC message and the security token, and wherein the receiving signaling is included in the received RRC message.

BB14. The method of any of embodiments BB1-BB13, wherein the received signaling is capability signaling that indicates how the wireless device is capable of generating a security token for integrity protecting an RRC message that requests resumption or re-establishment of an RRC connection.

BB15. The method of any of embodiments BB1-BB14, further comprising:
  receiving the RRC message and the security token;
  deciding, based on the received signaling, how to generate an expected security token;
  generating the expected security token based on said deciding; and
  verifying an integrity of the RRC message using the generated expected security token and the received security token.

BB. The method of any of the previous embodiments, further comprising:
  obtaining user data; and
  forwarding the user data to a host computer or a wireless device.

Group C Embodiments

C1. A wireless device configured to perform any of the steps of any of the Group A embodiments.

C2. A wireless device comprising processing circuitry configured to perform any of the steps of any of the Group A embodiments.

C3. A wireless device comprising:
  communication circuitry; and
  processing circuitry configured to perform any of the steps of any of the Group A embodiments.

C4. A wireless device comprising:
  processing circuitry configured to perform any of the steps of any of the Group A embodiments; and
  power supply circuitry configured to supply power to the wireless device.

C5. A wireless device comprising:
  processing circuitry and memory, the memory containing instructions executable by the processing circuitry whereby the wireless device is configured to perform any of the steps of any of the Group A embodiments.

C6. A user equipment (UE) comprising:
  an antenna configured to send and receive wireless signals;
  radio front-end circuitry connected to the antenna and to processing circuitry, and configured to condition signals communicated between the antenna and the processing circuitry;
  the processing circuitry being configured to perform any of the steps of any of the Group A embodiments;
  an input interface connected to the processing circuitry and configured to allow input of information into the UE to be processed by the processing circuitry;
  an output interface connected to the processing circuitry and configured to output information from the UE that has been processed by the processing circuitry; and
  a battery connected to the processing circuitry and configured to supply power to the UE.

C7. A computer program comprising instructions which, when executed by at least one processor of a wireless device, causes the wireless device to carry out the steps of any of the Group A embodiments.

C8. A carrier containing the computer program of embodiment C7, wherein the carrier is one of an electronic signal, optical signal, radio signal, or computer readable storage medium.

C9. A network node configured to perform any of the steps of any of the Group B embodiments.

C10. A network node comprising processing circuitry configured to perform any of the steps of any of the Group B embodiments.

C11. A network node comprising:
  communication circuitry; and
  processing circuitry configured to perform any of the steps of any of the Group B embodiments.

C12. A network node comprising:
  processing circuitry configured to perform any of the steps of any of the Group B embodiments;
  power supply circuitry configured to supply power to the network node.

C13. A network node comprising:
  processing circuitry and memory, the memory containing instructions executable by the processing circuitry whereby the network node is configured to perform any of the steps of any of the Group B embodiments.

C14. The network node of any of embodiments C9-C13, wherein the network node is a base station.

C15. A computer program comprising instructions which, when executed by at least one processor of a network node, causes the radio network node to carry out the steps of any of the Group B embodiments.

C16. The computer program of embodiment C14, wherein the network node is a base station.

C17. A carrier containing the computer program of any of embodiments C15-C16, wherein the carrier is one of an electronic signal, optical signal, radio signal, or computer readable storage medium.

Group D Embodiments

D1. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps of any of the Group B embodiments.

D2. The communication system of the previous embodiment further including the base station.

D3. The communication system of the previous 2 embodiments, further including the UE, wherein the UE is configured to communicate with the base station.

D4. The communication system of the previous 3 embodiments, wherein:
  the processing circuitry of the host computer is configured to execute a host application, thereby providing the user data; and the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
the processing circuitry of the host computer is configured to execute a host application; and
the UE's processing circuitry is configured to execute a client application associated with the host application, thereby providing the user data.

D18. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:
at the UE, executing a client application, thereby providing the user data to be transmitted; and
at the host computer, executing a host application associated with the client application.

D22. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:
the processing circuitry of the host computer is configured to execute a host application;

the UE is configured to execute a client application associated with the host application, thereby providing the user data to be received by the host computer.

D27. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

The following claims are selected embodiments of those that have been described above. The claims are related to an RRC message that requests resumption of an RRC connection. However, as supported by the text above, divisional applications or US continuation applications may of course be submitted with substantially the same claims, but where the RRC message requests re-establishment of the RRC connection.

Abbreviations

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
5G 5th Generation
CGI Cell Global Identifier
C-RNTI Cell RNTI
DL Downlink
E-SMLC Evolved-Serving Mobile Location Centre
eNB E-UTRAN NodeB
ePDCCH enhanced Physical Downlink Control Channel
E-UTRA Evolved UTRA
E-UTRAN Evolved UTRAN
GERAN GSM EDGE Radio Access Network
gNB Base station in NR
GSM Global System for Mobile communication
HSPA High Speed Packet Access
LPP LTE Positioning Protocol
LTE Long-Term Evolution
MAC Message Authentication Code
NPDCCH Narrowband Physical Downlink Control Channel
NR New Radio
PCell Primary Cell
PDCCH Physical Downlink Control Channel
PLMN Public Land Mobile Network
PUCCH Physical Uplink Control Channel
PUSCH Physical Uplink Shared Channel
RACH Random Access Channel
RAN Radio Access Network
RAT Radio Access Technology
RNTI Radio Network Temporary Identifier
RRC Radio Resource Control
SCell Secondary Cell
SDU Service Data UnitSI System Information
SIB System Information Block
SON Self Optimized Network
TTI Transmission Time Interval
UE User Equipment
UL Uplink
UMTS Universal Mobile Telecommunication System
USIM Universal Subscriber Identity Module
UTRAN Universal Terrestrial Radio Access Network
WLAN Wide Local Area Network

The invention claimed is:

1. A method performed by a wireless device for use in a wireless communication system, the method comprising:
receiving signaling indicating how the wireless device is to generate a message authentication code (MAC) for integrity protecting a Radio Resource Control (RRC) message that requests resumption of an RRC connection;
generating the MAC according to the signaling; and
transmitting the RRC message and the generated MAC.

2. The method of claim 1, wherein the signaling indicates which parameters are to be input to an integrity algorithm for generating the MAC.

3. The method of claim 1, wherein a first way to generate the MAC is to input a first set of parameters into an integrity algorithm, and a second way to generate the MAC is to input a second set of parameters into the same algorithm or a different integrity algorithm, wherein the first set of parameters is a subset of the second set of parameters, and wherein the signaling indicates:
which of the first way or the second way the wireless device is to use to generate the MAC; or
that the wireless device is to use the second way to generate the MAC.

4. The method of claim 1, wherein the signaling indicates whether, or that, the wireless device is to generate the MAC as a function of one or more of:
a cause field indicating a cause for requesting resumption of the RRC connection; and
a Cell Radio Network Temporary Identifier (C-RNTI).

5. The method of claim 1, comprising generating a Packet Data Convergence Protocol (PDCP) packet that conveys the RRC message and that includes the MAC in a header of the PDCP packet.

6. The method of claim 1, wherein the signaling comprises or is included in System Information.

7. The method of claim 1, comprising receiving an RRC Release message that indicates the wireless device is to release or suspend the RRC connection, wherein the signaling is included in the RRC Release message.

8. The method of claim 1, comprising receiving a Non-Access Stratum (NAS) message, wherein the signaling is included in the NAS message.

9. The method of claim 1, wherein the MAC is a resume-MAC-I.

10. The method of claim 1, wherein the signaling is received from a network node and indicates how the wireless device is to generate the MAC for integrity protecting the RRC message that requests resumption of the RRC connection when the network node is a source or target of that resumption.

11. The method of claim 1, wherein the signaling indicates how the wireless device is to generate the MAC for integrity protecting the RRC message that requests a certain target network node or a certain target cell to resume an RRC connection.

12. The method of claim 1, comprising:
generating an RRC message for requesting a certain target network node or a certain target cell to resume an RRC connection previously established at a certain source network node or a certain source cell;

deciding, based at least in part on the received signaling, how the wireless device is to generate the MAC for integrity protecting the generated RRC message;

generating the MAC for integrity protecting the generated RRC message, according to said deciding; and transmitting the RRC message and the generated MAC.

13. The method of claim 1, comprising transmitting, from the wireless device, signaling indicating how the wireless device has generated, will generate, or is capable of generating the MAC for integrity protecting the RRC message that requests resumption of the RRC connection.

14. The method of claim 1, wherein the signaling indicates that the wireless device is to generate the MAC using a whole RRCResumeRequest message as input to an integrity algorithm.

15. A wireless device comprising:

processing circuitry and a memory, the memory containing instructions executable by the processing circuitry whereby the wireless device is configured to perform a method according to claim 1.

16. A method performed by a wireless device for use in a wireless communication system, the method comprising:

transmitting, from the wireless device, signaling indicating how the wireless device has generated, will generate, or is capable of generating a message authentication code (MAC) for integrity protecting a Radio Resource Control (RRC) message that requests resumption of an RRC connection.

17. The method of claim 16, wherein the signaling indicates that the wireless device is to generate the MAC using a whole RRCResumeRequest message as input to an integrity algorithm.

18. The method of claim 16, wherein a first way to generate the MAC is to input a first set of parameters into an integrity algorithm, wherein a second way to generate the MAC is to input a second set of parameters into the integrity algorithm, and wherein the signaling indicates:

which of the first way or the second way the wireless device has used, will use, or is capable of using to generate the MAC; or that the wireless device has used, will use, or is capable of using the second way to generate the MAC.

19. A method performed by a network node for use in a wireless communication system, the method comprising:

transmitting, from the network node to a wireless device, signaling indicating how the wireless device is to generate a message authentication code (MAC) for integrity protecting a Radio Resource Control (RRC) message that requests resumption of an RRC connection.

20. The method of claim 19, wherein a first way to generate the MAC is to input a first set of parameters into an integrity algorithm, wherein a second way to generate the MAC is to input a second set of parameters into the integrity algorithm, and wherein the signaling indicates:

which of the first way or the second way the wireless device is to use to generate the MAC; or that the wireless device is to use the second way to generate the MAC.

21. A network node comprising:

processing circuitry and a memory, the memory containing instructions executable by the processing circuitry whereby the network node is configured to perform a method according to claim 19.

22. The network node of claim 21, wherein the network node is a base station.

23. The network node according to claim 22, wherein the base station is a gNB.

24. A method performed by a network node for use in a wireless communication system, the method comprising:

receiving, from a wireless device, signaling indicating how the wireless device has generated, will generate, or is capable of generating a MAC for integrity protecting a Radio Resource Control (RRC) message that requests resumption of an RRC connection.

25. A computer readable storage medium which contains a computer program which when executed by at least one processor of a wireless device, causes the wireless device to:

receive signaling indicating how the wireless device is to generate a message authentication code (MAC) for integrity protecting a Radio Resource Control (RRC) message that requests resumption of an RRC connection;

generate the MAC according to the signaling; and transmit the RRC message and the generated MAC.

26. A communication system including a host computer comprising:

processing circuitry configured to provide user data; and a communication interface configured to forward the user data to a cellular network for transmission to a user equipment, wherein the cellular network comprises a base station having a radio interface and processing circuitry, the base station's processing circuitry configured to transmit, to the user equipment, signaling indicating how the user equipment is to generate a message authentication code (MAC) for integrity protecting a Radio Resource Control (RRC) message that requests resumption of an RRC connection.

* * * * *